(12) United States Patent
Hiraguchi et al.

(10) Patent No.: US 7,770,834 B2
(45) Date of Patent: Aug. 10, 2010

(54) RECORDING TAPE CARTRIDGE

(75) Inventors: Kazuo Hiraguchi, Kanagawa (JP); Shigeru Nishiyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 885 days.

(21) Appl. No.: 11/288,216

(22) Filed: Nov. 29, 2005

(65) Prior Publication Data

US 2006/0169819 A1 Aug. 3, 2006

(30) Foreign Application Priority Data

Dec. 1, 2004 (JP) ............................. 2004-349036
Mar. 16, 2005 (JP) ............................. 2005-074558

(51) Int. Cl.
*G03B 1/58* (2006.01)
(52) U.S. Cl. ................. 242/332.4; 242/608.8
(58) Field of Classification Search ............. 242/332.4, 242/532.1, 338, 338.1, 348, 608.8, 609.4; 360/132
See application file for complete search history.

(56) References Cited

U.S. PATENT DOCUMENTS

| | | | | |
|---|---|---|---|---|
| 4,008,490 A | * | 2/1977 | Lemelson | ................... 360/132 |
| 4,033,523 A | * | 7/1977 | Roman | ..................... 242/338.1 |
| 4,083,508 A | | 4/1978 | Pattillo | |
| 4,371,123 A | | 2/1983 | Watanabe | |
| 4,490,757 A | * | 12/1984 | Mogi | |
| 6,315,230 B1 | * | 11/2001 | Hansen et al. | ............... 242/348 |
| 6,318,657 B1 | * | 11/2001 | Nayak | ..................... 242/338.1 |
| 6,700,742 B2 | * | 3/2004 | Tsuyuki et al. | .......... 242/338.1 |
| 6,728,066 B2 | * | 4/2004 | Morita et al. | ................ 360/132 |
| 2004/0031868 A1 | | 2/2004 | Tahara | |
| 2004/0035969 A1 | * | 2/2004 | Stamm et al. | |
| 2004/0136112 A1 | * | 7/2004 | Bengds et al. | |
| 2004/0183743 A1 | * | 9/2004 | Reasoner et al. | |
| 2004/0238670 A1 | | 12/2004 | Mewes et al. | |
| 2005/0133583 A1 | * | 6/2005 | Tada | |
| 2005/0184181 A1 | * | 8/2005 | Hiraguchi | ................ 242/338.1 |

FOREIGN PATENT DOCUMENTS

| | | |
|---|---|---|
| JP | U-62-158689 | 10/1987 |
| JP | 04-090079 U | 8/1992 |
| JP | B-05-68036 | 9/1993 |

(Continued)

OTHER PUBLICATIONS

Japanese Office Action dated Jun. 16, 2009, with translation (3 pages).

*Primary Examiner*—William A Rivera
(74) *Attorney, Agent, or Firm*—Margaret A. Burke; Sheldon J. Moss

(57) ABSTRACT

Outer diameters of upper and lower flanges of a reel are formed equal to each other irrespective of a diameter of a hub, and a cylindrical wall having the same inner diameter as the hub of the reel having the small diameter hub is provided in the reel having the large diameter hub. Thereby, there is provided a low-capacity type recording tape cartridge, in which other parts can be used both as the reel having the small diameter hub and the reel having the large diameter hub only by changing the reels and a displaced angle of a recording tape does not vary with respect to a case sidewall of a leader member.

10 Claims, 18 Drawing Sheets

FOREIGN PATENT DOCUMENTS

| | | |
|---|---|---|
| JP | 2002-140879 A | 5/2002 |
| JP | 2003-030955 A | 1/2003 |
| JP | 2003-091963 A | 3/2003 |
| JP | 2003-203456 A | 7/2003 |
| JP | 2004-246977 A | 9/2004 |

* cited by examiner

US 7,770,834 B2

RECORDING TAPE CARTRIDGE

CROSS-REFERENCE TO RELATED APPLICATION

This application claims priorities under 35 USC 119 from Japanese patent documents, 2004-349036 and 2005-74558, the disclosures of which are incorporated by references herein.

BACKGROUND OF THE INVENTION

1. Field of the Invention

The present invention relates to a recording tape cartridge for accommodating a single reel in a case. Wound around the reel is a recording tape such as a magnetic tape mainly used as a recording and reproduction medium for a computer and the like 2. Description of the Related Art Conventionally there is known a so-called one-reel type recording tape cartridge for rotatably accommodating the single reel, around which the recording tape such as the magnetic tape used as a data recording and reproduction medium for the computer and the like is wound, in the case made of a synthetic resin. Conventionally there is also known a so-called two-reel type recording tape cassette in which the two reels are rotatably accommodated in the case made of the synthetic resin. In the two-reel type recording tape cassette, the recording tape such as the magnetic tape used as the data recording and reproduction medium for a video picture and the like is wound around one of the reels, and an end portion of the recording tape is fixed to the other reel.

In the two-reel type recording tape cassette, conventionally there is a low-capacity type recording tape cassette. In the two-reel type recording tape cassette, the recording tape is regulated by a tape guide provided in the case so as to come into slidably contact with a recording and reproduction head on a drive apparatus side, so that the low-capacity type recording tape cassette can be produced only by decreasing a winding amount of the recording tape or by changing the reel to another reel having an increased diameter of a hub. For example, Japanese Patent Application Publication (JP-B) No. 5-68036, and Japanese Utility Model Application Laid-Open (JP-U) No. 62-158689 disclose the recording tape cassette having the increased diameter of the hub around which the recording tape is wound.

On the contrary, there is no low-capacity type recording tape cassette in the one-reel type recording tape cartridge. In the one-reel type recording tape cartridge, because there are many parts engaging the accommodated reel, when the hub diameter is increased, there is a problem that design change is required for both the hub and the parts engaging the hub. On the other hand, when the winding amount of the recording tape a leader member e.g. a leader tape is attached to the end portion thereto is reduced without changing hub diameter, a displaced angle of the leader tape is caused to vary with respect to a case sidewall depending on the tape amount. When the drawing member on the drive apparatus draws the leader tape which is held near an opening of the case, there is the problem that a passage angle varies. Accordingly, the low-capacity type recording tape cartridge does not exist in the one-reel type recording tape cartridge.

SUMMARY OF THE INVENTION

An object of the present invention is to provide a low-capacity type recording tape cartridge for the one-reel type recording tape cartridge. Specifically an object of the invention is to provide the recording tape cartridge, in which other parts can be used for both of the usual type tape cartridge and the low-capacity type tape cartridge only by changing a usual reel to the low-capacity reel and the displaced angle of the leader member attached to the recording tape does not vary with respect to the case sidewall even if the low-capacity type reel is accommodated.

A first aspect of the invention is a recording tape cartridge comprising: a large-hub reel or a small hub reel in which diameters of hubs are different from each other, the reel has the hub around which a recording tape is wound and upper and lower flanges which are provided at upper and lower end surfaces of the hub and regulating end portions in a width direction of the recording tape; a case which rotatably accommodates the large-hub reel or the small-hub reel; and a leader member which is attached to an end portion of the recording tape, wherein the recording tape drawn from the large-hub reel or the recording tape drawn from the small-hub reel is arranged substantially along a sidewall of the case during nonuse in which the leader member is held in the case, and thereby recording and reproduction can be performed by a same drive apparatus with respect to the tape cartridges whether the large-hub reel or the small-hub reel is accommodated in the case.

A second aspect of the invention is a recording tape cartridge comprising a reel in which the reel has a hub and upper and lower flanges, a recording tape being wound around the hub, the upper and lower flanges being provided at upper and lower end surfaces of the hub, and the upper and lower flanges regulating end portions in a width direction of the recording tape; a case which rotatably accommodates the reel irrespective of a diameter of the hub; and a leader member which is attached to an end portion of the recording tape, wherein the recording tape drawn from the reel is arranged substantially along a sidewall of the case irrespective of the diameter of the hub during nonuse in which the leader member is held in the case, and thereby recording and reproduction can be performed by a same drive apparatus with respect to the tape cartridges regardless of which reel among reels whose hubs have different diameters is accommodated in the case.

According to the first aspect and the second aspect of the invention, the recording-tape leader member drawn from the reel is displaced along the case sidewall. Accordingly, the displaced angle of the recording-tape leader member does not vary with respect to the case sidewall irrespective of the hub diameter.

In the first aspect and the second aspect of the invention, it is possible that elevation angles of the upper and lower flanges of the reel are equal to each other irrespective of a size of the hub, and a distance between the upper flange and the lower flange in an outer peripheral surface of the hub is larger when the hub has the large diameter than the hub has the small diameter.

According to the above, edges of the recording tape wound around the hub are appropriately regulated by the upper and lower flanges irrespective of the hub diameter, so that the recording tape is stably wound and hub vibration, i.e. flange vibration is decreased during the rotation of the reel.

In the first aspect and the second aspect of the invention, it is also possible that a cylindrical wall having an approximately same inner diameter and an approximately same height as the small diameter hub is provided in the reel having the large diameter hub, and during nonuse in which the leader member is held in the case, a brake member which blocks rotation of the reel is accommodated in the hub when the reel has the small diameter hub while the brake member is accommodated in the cylindrical wall when the reel has the large diameter hub.

According to the above, since other parts except the reels having the different hub diameters can be used for the cartridges although the tape capacity varies, the production cost is not increased.

In the first aspect and the second aspect of the invention, it is possible that the leader member formed in a film-tape shape is held by a slit-shaped housing portion formed along the sidewall of the case.

In the first aspect and the second aspect of the invention, it is possible that an RFID is provided in the case, which identifies whether the reel accommodated in the case is the one having the large diameter hub or the small diameter hub.

Therefore, when the recording tape cartridge is taken out from a library apparatus or when the recording tape cartridge is loaded in the drive apparatus, it can be identified that whether the reel accommodated in the case is the low-capacity type or the usual type.

In the first aspect and the second aspect of the invention, it is possible that a common lock member which regulates movement of the reel in a height direction irrespective of the diameter of the hub is provided in a top plate of the case, and, during nonuse in which the leader member is held in the case, the lock member engages the cylindrical wall when the reel has the large diameter hub while the lock member engages the hub when the reel has the small diameter hub.

In this manner, since other parts except the reels having the different hub diameters can be used for the tape cartridges although the tape capacity varies, a production cost is not increased.

In the first aspect and the second aspect of the invention, it is possible that the large diameter hub and the cylindrical wall are joined to each other by an annular joint portion, and a region where the annular joint portion is joined to the large diameter hub is located in a half of the distance between the upper flange and the lower flange or toward the lower flange side at the outer peripheral surface of a drum of the large diameter hub.

In this manner, strength of the large diameter hub is further improved.

In the first aspect and the second aspect of the invention, it is possible that a thickness of the hub is equal to or larger than a thickness of the annular joint portion.

In this manner, deformation of the large diameter hub can be prevented.

In the first aspect and the second aspect of the invention, it is possible that the upper flange of the hub and the annular joint portion are integrally made of a resin material, and a lower end surface of the hub abuts the lower flange while welding is performed between the lower flange and a convex portion provided at a lower surface of the annular joint portion.

In this manner, the welding of the lower flange can stably be performed while a flow path of the resin material flowing from the annular joint portion to the hub can appropriately be secured during molding.

A third aspect of the invention is a recording tape cartridge comprising a large-hub reel or a small-hub reel in which diameters of hubs are different from each other, the reel has the hub around which a recording tape is wound and upper and lower flanges which are provided at upper and lower end surfaces of the hub and regulate end portions in a width direction of the recording tape; a case which rotatably accommodates the large-hub reel or the small-hub reel; and a leader member which is attached to an end portion of the recording tape, wherein outer diameters of the upper and lower flanges of the large-hub reel or the small-hub reel are equal to each other, and thereby recording and reproduction can be performed by a same drive apparatus with respect to the tape cartridges whether the large-hub reel or the small-hub reel is accommodated in the case.

A fourth aspect of the invention is a recording tape cartridge comprising a reel which has a hub and upper and lower flanges, a recording tape being wound around the hub, the upper and lower flanges being provided at upper and lower end surfaces of the hub and regulating end portions in a width direction of the recording tape; a case which rotatably accommodates the reel irrespective of a diameter of the hub; and a leader member which is attached to an end portion of the recording tape, wherein outer diameters of the upper and lower flanges are equal to each other irrespective of the diameter of the hub, and thereby recording and reproduction can be performed by a same drive apparatus regardless of which reel among the reels whose hubs have the different diameters is accommodated in the case.

According to the third aspect and the fourth aspect of the invention, the positions of the outermost peripheries of the recording tapes become equal to each other irrespective of the hub diameter. Accordingly, the displaced angle of the recording-tape leader member does not vary with respect to the case sidewall irrespective of the hub diameter.

DESCRIPTION OF THE PREFERRED EMBODIMENT

Embodiments of the present invention will now be described with reference to the drawings.

First, the recording tape cartridge in which the usual reel is accommodated will be explained, and then the recording tape cartridge in which the low-capacity type reel is accommodated will be explained.

For convenience of description, it is assumed that a front direction. A direction in which the recording tape cartridge is loaded into a drive device is regarded as a front direction. The direction is indicated by an arrow A, and a left direction is indicated by an arrow B, and with these directions as reference, front and rear, left and right, and up and down directions are defined.

Figure 1:
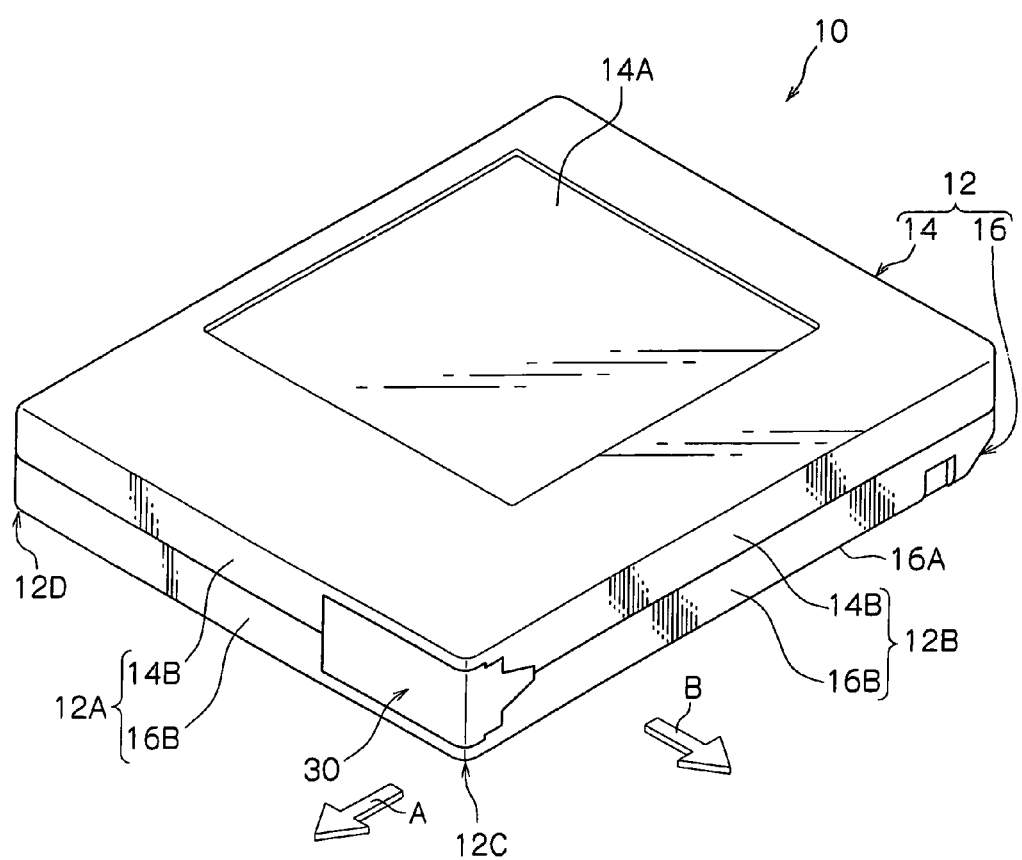
FIG. 1 is a perspective view schematically showing a recording tape cartridge according to the present invention.

Referring to FIG. 1, a recording tape cartridge 10 includes a substantially box-shaped case 12 comprising an upper case half 14 and a lower case half 16 each formed from a plastic material such as polycarbonate. The upper and lower case halves 14 and 16 are jointed together by means of screwing or ultrasonic welding, with a peripheral wall 14B projectingly provided at a peripheral edge of a top plate 14A being disposed in abutment with a peripheral wall 16B projectingly provided at a peripheral edge of a bottom plate 16A.

Figure 15:
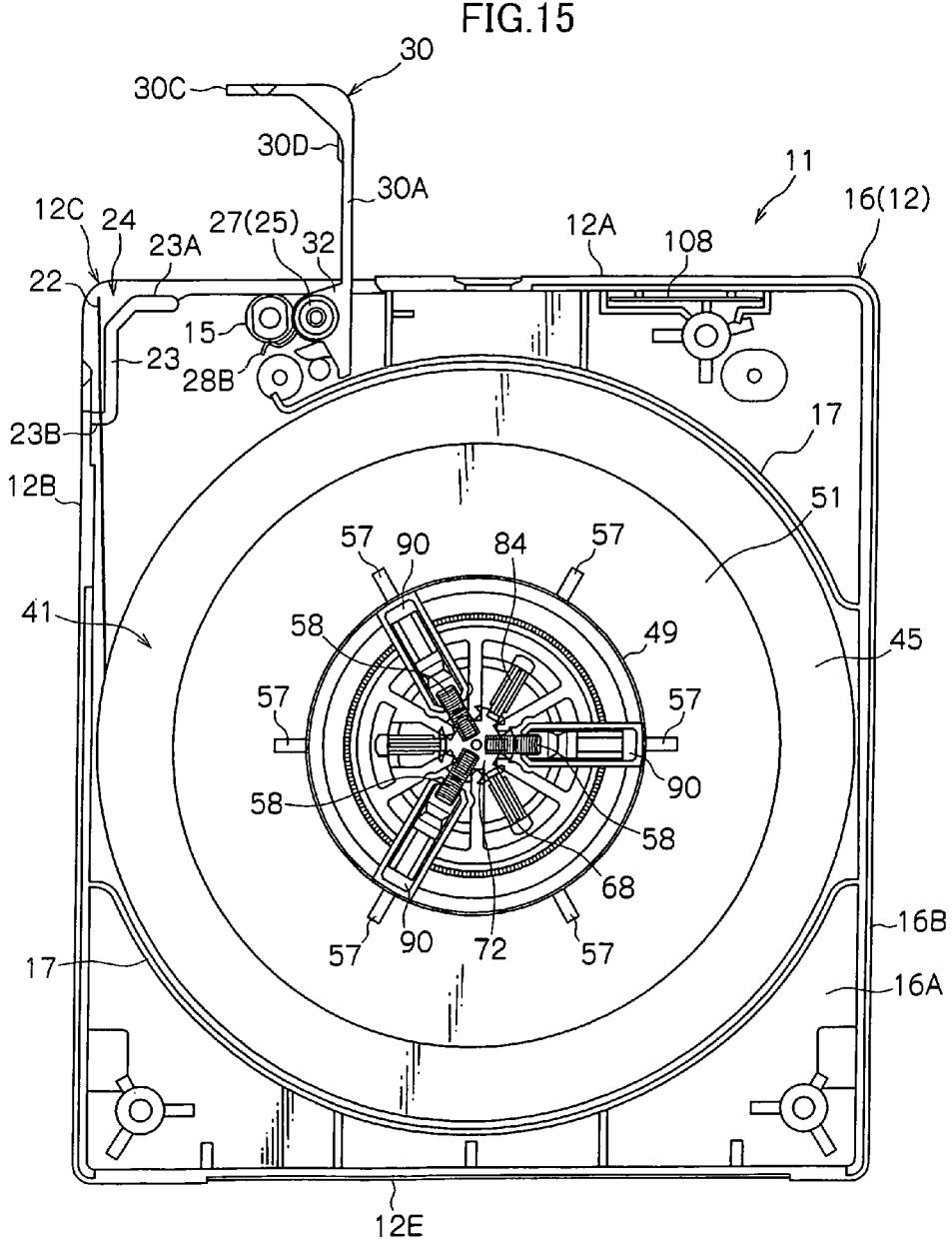
FIG. 15 is a plan view schematically showing the state in which a top plate is removed in the low-capacity type recording tape cartridge according to the invention.

As shown in FIG. 15, an oscillation regulating wall 17 is vertically provided in the case 12. The one reel is rotatably accommodated inside the oscillation regulating wall 17.

Figure 2:
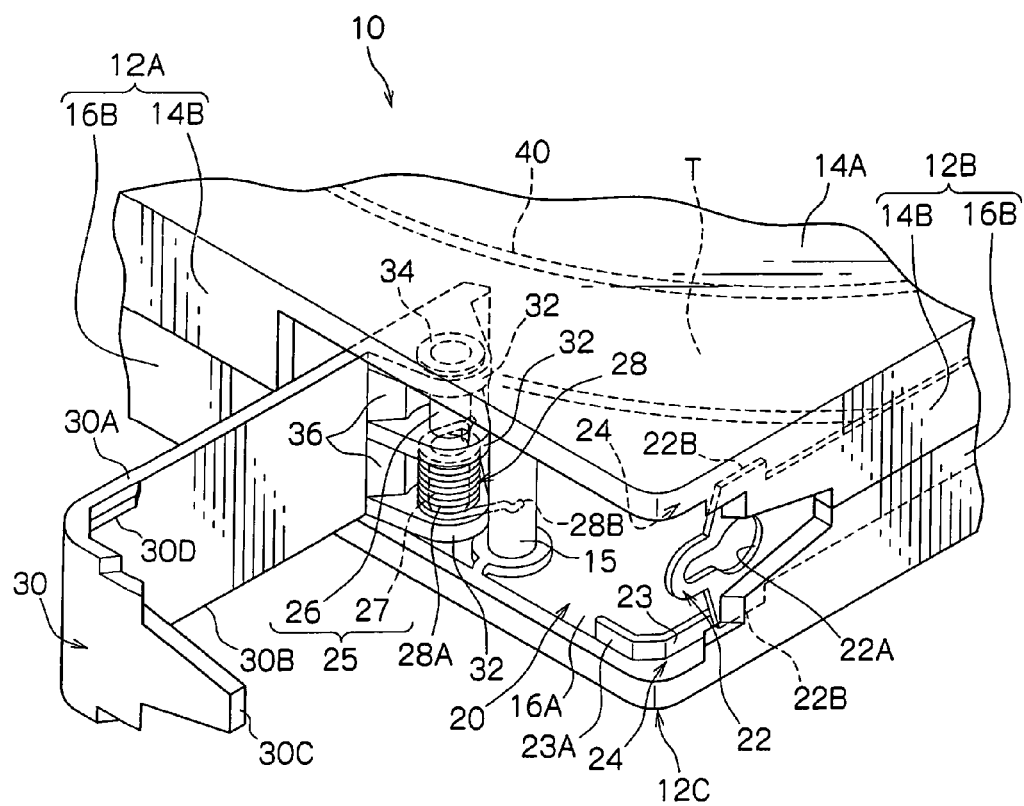
FIG. 2 is a schematic perspective view near a door of the recording tape cartridge of the invention when the door is opened.

As shown in FIG. 2, an opening 20, through which the recording tape T wound on the reel 40 is drawn, is formed in the recording tape cartridge 10 in the neighborhood of a left front side corner portion 12C thereof. More specifically, the opening 20 is formed extending through a front wall 12A and a left side wall 12B in the neighborhood of the corner portion 12C, and it is arranged so that a leader tape 22 of the recording tape T can be drawn out through the opening 20. The leader tape 22 is connected to the end portion of the recording tape T with a splice tape (not shown), and the leader tape 22 is arranged substantially along the left sidewall 12B.

The term "corner portion" as used herein refers to a ridge line portion where the front wall 12A and the left side wall 12B intersect substantially at a right angle with each other as seen in a plan view. The opening 20 is not limited to be provided near the corner portion 12C ahead of the recording tape cartridge 10 on the left side. For example, the opening 20 is provided near the corner portion 12D ahead of the recording tape cartridge 10 on the right side.

The leader tape 22 is a drawn member, which the drawing member of a drive device (not shown) engages in order to draw the recording tape T. The leader tape 22 is formed with antistatic treatment, or at least a surface of the leader tape 22 is covered with a substance having electric conductivity. The drawing member on the drive device is also formed in a tape shape, and an aperture 22A, which the drawing member engages, is provided near a leading end of the leader tape 22 while perforated.

The leader tape 22 is configured to be held in the case 12 by housing the protrusions 22B in slot portions respectively. The slot portions 24 are formed in an inner surface of the upper case half 14 and an inner surface of the lower case half 16 respectively.

The slot portions 24 are slit-shaped housing portions which are respectively formed by the peripheral wall 14B of the upper case half 14, the peripheral wall 16B of the lower case half 16, and regulating walls 23. The regulating walls 23 are vertically provided so as to have a predetermined gap along the peripheral walls 14B and 16B respectively. Rear ends of the regulating walls 23 are integrally formed with the peripheral walls 14B and 16B to form rear walls 23B (see FIG. 15), which close the rear side. In order not to move the leader tape 22 rearward, the leader tape 22 is arranged substantially along the left sidewall 12B while the positions of the protrusions 22B are regulated by the upper and lower rear walls 23B.

Front ends of the regulating walls 23 are bent substantially along the shape of the case 12, and the front ends of the regulating walls 23 open the front sides of the slot portions 24 while the front sides face the opening 20. Therefore, the protrusions 22B can freely enter and go out from the front sides of the slot portions 24, and a drawing passage of the leader tape 22 is secured to preferably draw the leader tape 22.

The opening 20 is closed with a door 30 when the recording tape cartridge 10 is in non-use. The door 30 is substantially L-shaped as seen in a plan view having substantially the same shape and size as that of the opening 20.

Projections 30D are integrally formed in the upper and lower portions on the right side of the bent region in the inside surface of the door 30. The projections 30D abut a front faces 23A of the regulating walls 23, bent toward the side of the front wall 12A, when the opening 20 is closed. A leading end portion 30C of the door 30, located on the side of the left sidewall 12B when the opening 20 is closed, is formed in a substantially trapezoid when viewed from the side. Although the door 30 is preferably made of olefin resins such as polyoxymechylene, the door 30 may be made of a resin such as polycarbonate or a metal such as SUS.

Fulcrum shafts 25 which are of a rotary fulcrum of the door 30 are provided while protruded on the sides of the front walls 12A of the upper case half 14 and the lower case half 16 respectively. The fulcrum shaft 25 on the side of the upper case half 14 is formed in a cylindrical boss 26, and the fulcrum shaft 25 on the side of the lower case half 16 is formed in a protruded shaft 27 having a two-stage cylinder. The fulcrum shafts 25 are formed by fitting a leading end portion (not shown) of the protruded shaft 27 on the side of the lower case half 16 into a hole (not shown) of the boss 26 on the side of the upper case half 14. The diameter of the protruded shaft 27 except for the leading end portion is formed slightly smaller than the diameter of the boss 26.

Still further, the door 30 is provided with three plate-like rotational sliding portions 32 which extend in parallel from the inner surface in the neighborhood of the right end portion thereof (at a position deviated a predetermined distance leftward from the right end). More specifically, the rotational sliding portions 32 extend from the upper and lower edges of the inner surface of the door 30 and an intermediate position deviated slightly downward from the center. Each of the rotational sliding portions 32 is formed with a through aperture through which the fulcrum shaft 25 is loosely inserted. Thus, the door 30 is rotatably supported with the fulcrum shaft 25 being inserted through the respective through apertures.

On the upper surface of the uppermost rotational sliding portion 32 and the lower surface of the lowermost rotational sliding portion 32 are provided annular convexes 34 surrounding the through apertures, respectively. It is so arranged that a gap in the range from about 0.3 mm to 0.5 mm is defined between the upper edge surface 30A of the door 30 and the upper case half 14 and between the lower edge surface 30B of the door 30 and the lower case half 16, by disposing the annular convexes 34 in contact with the upper and lower case halves 14 and 16 respectively.

Therefore, in the door 30, only the annular convexes 34 are in contact with the upper case half 14 and the lower case half 16, which allows the door 30 to be rotated with little sliding resistance.

In the door 30, it is desirable that at least the rotational sliding portion 32 and the annular convex 34 are made of the olefin resin such as polyoxymechylene. Therefore, the sliding resistance to the fulcrum shaft 25 can be decreased while the sliding resistance can further be decreased to the upper case half 14 and lower case half 16 made of the resin such as polycarbonate.

Further, on the inner surface of the door 30 between the rotational sliding portions 32 are provided protrusions 36 which are arcuate in shape as seen in a sectional plan view and extend along the peripheral surface of the fulcrum shaft 25.

That is, the coil portion 28A of the torsion spring 28 is held between the rotational sliding portion 32 of the lower end portion and the rotational sliding portion 32 of the middle portion, and the coil portion 28A of the torsion spring 28 is attached by inserting the protruded shaft 27 having the diameter smaller than that of the boss 26 into the coil portion 28A of the torsion spring 28. An end portion 28B of the torsion spring 28 is engaged by a machine-screw boss 15 (machine-screw boss protruded in the lower case half 16) of the case 12, and the other end portion is engaged by an edge end portion on the right side of a protrusion 36.

Since the coil portion 28A of the torsion spring 28 is arranged between the rotational sliding portions 32, when the rotational sliding portions 32 are made of the olefin resin such as polyoxymechylene, the rotational sliding portions 32 are hardly cut compared with the case 12 made of the resin such as polycarbonate. That is, even if the coil portion 28A of the torsion spring 28 slides by the rotation of the door 30, abrasion dust and the like are hardly generated, so that it is suitable to the recording tape.

Figure 3:
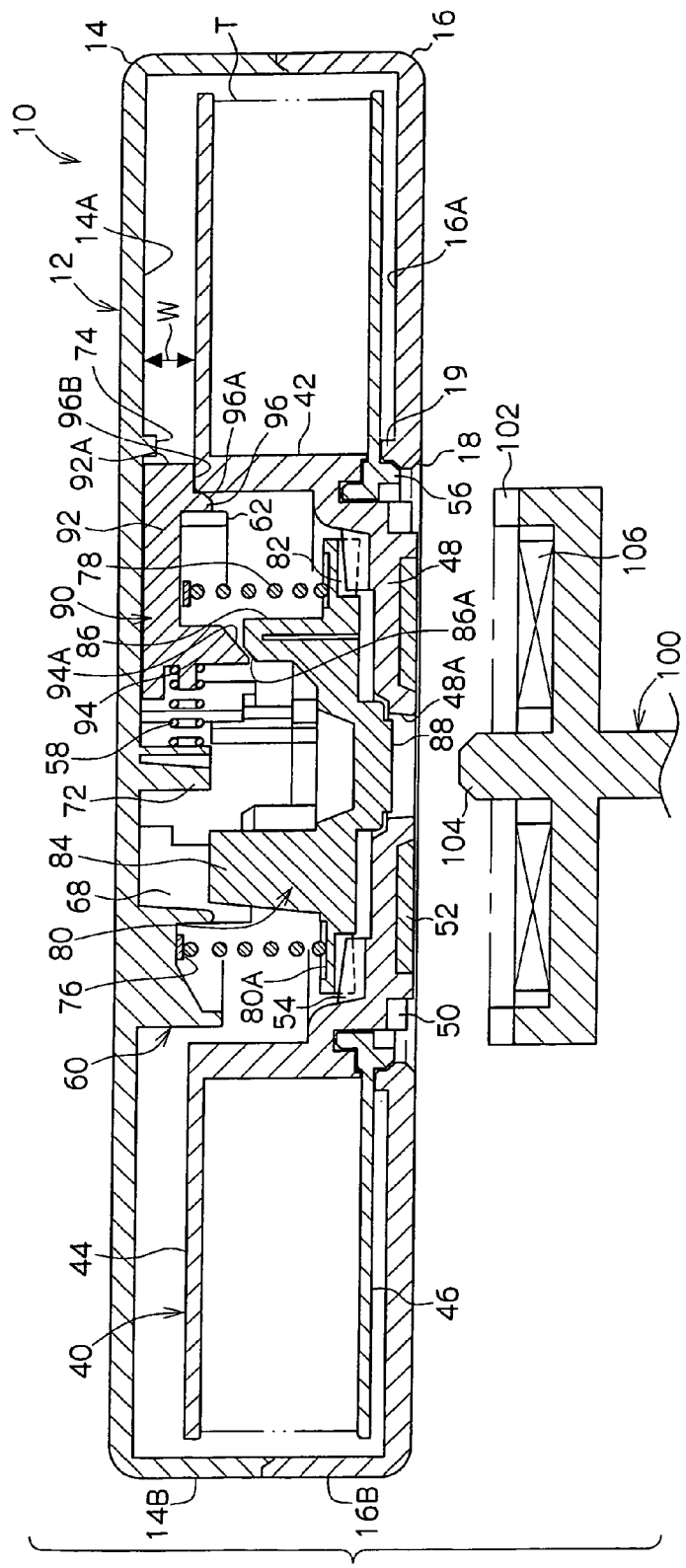
FIG. 3 is a sectional side view schematically showing a state of the recording tape cartridge of the invention before a rotary shaft rises.
Figure 4:
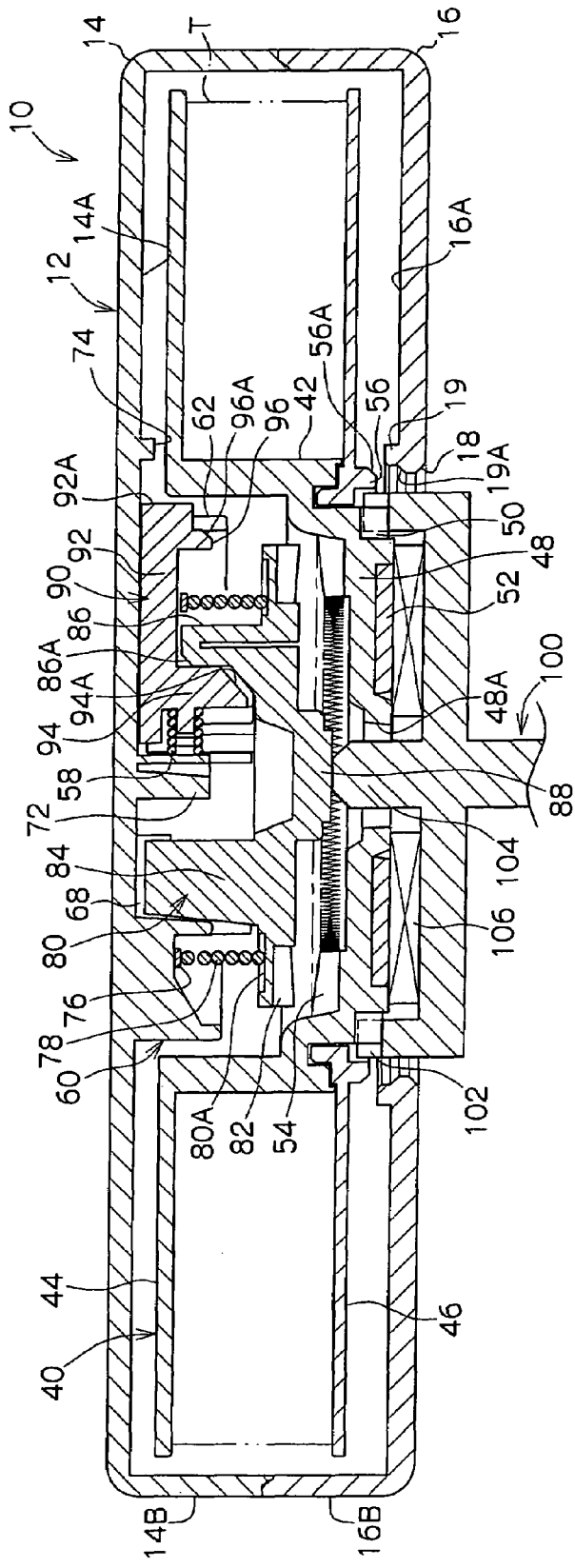
FIG. 4 is a sectional side view schematically showing the state of the recording tape cartridge of the invention after the rotary shaft rises.

FIGS. 3 and 4 are a sectional side view schematically showing a state in which a reel 40 is accommodated in the case 12. The reel 40 is formed from a resin material and comprises the reel hub 42 having a bottomed cylindrical shape, the upper flange 44 integrally provided on and extending from the upper end portion of the reel hub 42, and the lower flange 46 attached to the lower end portion of the reel hub 42 by means of ultrasonic welding, as mentioned above.

The reel 40 is made of a resin material in which 20% glass fiber is added to polycarbonate.

The hub 42 and the lower flange 46 are made of the resins which are mutually soluble respectively, so that solvent welding can easily be performed between the hub 42 and the lower flange 46 by ultrasonic wave. A distance between the upper flange 44 and the lower flange 46 are formed so as to be substantially equal to a width of the recording tape T, which allows the position to be regulated in the width direction of the recording tape T wound around the hub 42.

Further, the reel hub 42 is provided, on the lower flange 46 side, with a bottom wall 48 having a through hole 48A formed at an axial center portion thereof. A reel gear 50 is formed in an annular shape on the lower surface of the bottom wall 48. In response to the reel 40 being pressed against the lower case half 16 due to a biasing force of a compression coil spring 78, the reel gear 50 is exposed through a circular gear opening 18 formed at a generally axial center of the lower case half 16 so as to be meshed with a drive gear 102 provided on a rotary shaft 100 of the drive device, thereby transmitting a rotary force to the reel 40.

As shown in FIG. 4, an annular rib 19 is vertically provided upward (in the case 12) in a periphery of the gear opening 18, and a tapered surface 19A is formed in the inner peripheral surface (peripheral surface on the side of the gear opening 18). An annular rib 56 is vertically provided downward in the lower surface of the reel 40 (lower flange 46) and in the outside in the radial direction of the reel gear 50, a tapered surface 56A is formed in the outer peripheral surface of the annular rib 56. Accordingly, as shown in FIG. 3, when the recording tape cartridge 10 is not used, the reel 40 is positioned and supported by the lower case half 16 (case 12) by bringing the tapered surface 56A of the annular rib 56 into face-contact with the tapered surface 19A of the annular rib 19.

An annular reel plate 52 formed from a magnetic material is integrally fixed to a portion radially inside of the reel gear 50 using an insert molding technique or the like. Under a condition that the drive gear 102 and reel gear 52 are meshed with each other, the reel plate 52 is drawn due to a magnetic force of an annular magnet 106 interposed between the drive gear 102 and a release projection 104 which will be described below. This prevents an axial shift which tends to occur between the reel 40 and the rotary shaft 100 while at the same time making it possible to maintain the meshing relationship between the reel gear 50 and the drive gear 102. With such an arrangement, as the rotary shaft 100 rotates about its axis, the reel 40 is rotated therewith within the case 12.

Meanwhile, on the upper surface side of the bottom wall 48 of the hub 42, an engagement gear 54 is annularly formed which is adapted to be meshed with a brake gear 82 of a brake member 80. The brake member 80 is formed in a shape of a disk and accommodated within the hub 42 so as to be movable vertically (in an axial direction of the reel 40), with the brake gear 82 being provided annularly at an outer periphery of the lower surface thereof.

Figure 5:
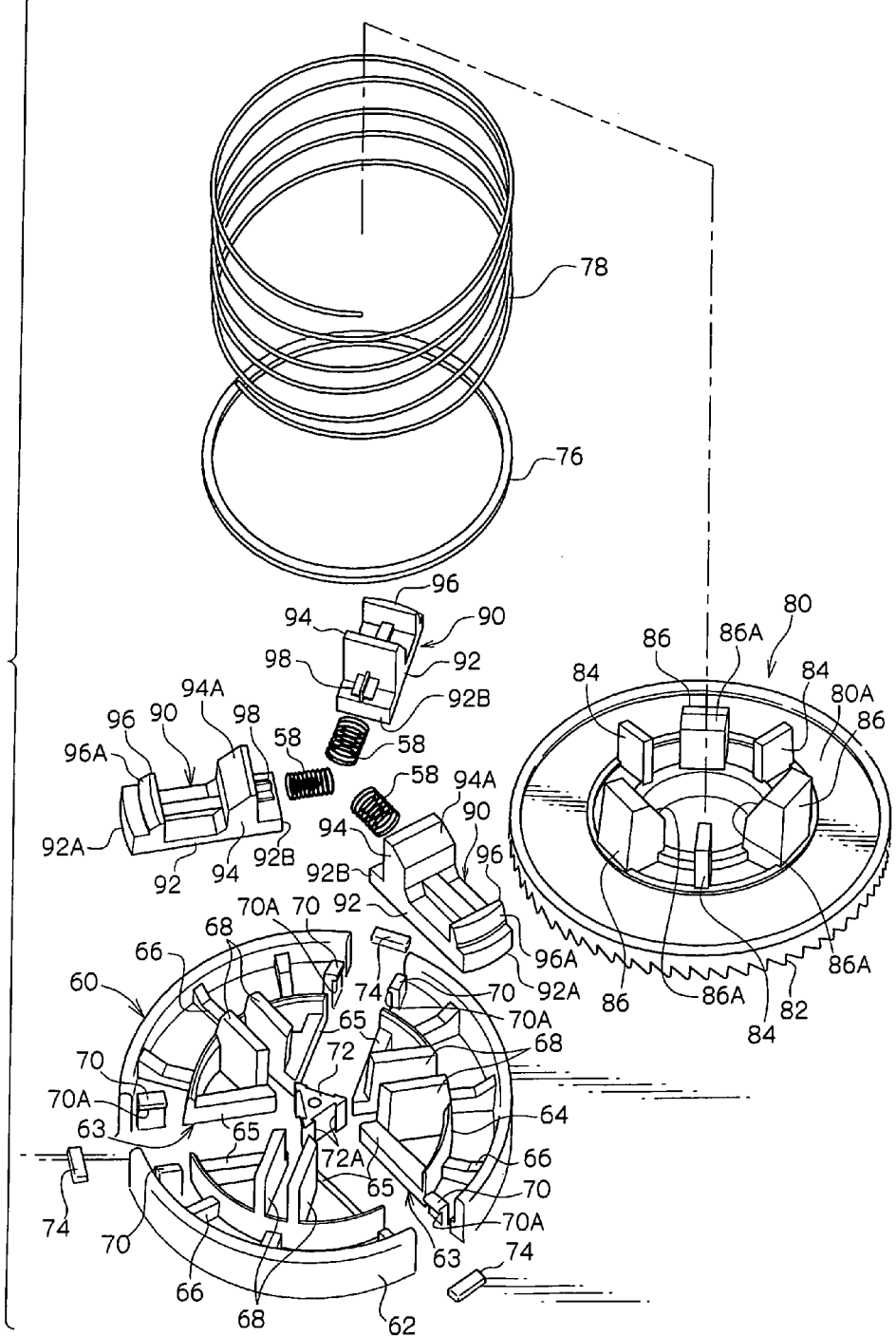
FIG. 5 is an exploded perspective view schematically showing a configuration of an attachment portion formed in an upper half case of the recording tape cartridge of the invention.

Further, as shown in FIG. 5, on the upper surface of the brake member 80 are provided upright, with equal spacing and in an alternate form, a plurality of (three in this embodiment) plate-like guide portions 84 which are adapted to be interposed between guide wall portions 68 (described later) of the upper case half 14 and a plurality of (three in this embodiment) generally rectangular column-shaped engagement projections 86 which are adapted to be engaged with cam portions 94 of a plurality of (three in this embodiment) lock members 90 which will be described later. Each of the engagement projections 86 has its radially inside portion shaped to form a tapered surface 86A having an inclination in the range of 30-60 degrees, preferably of 45 degrees and adapted to be disposed in engagement with a tapered surface 94A formed on the cam portion 94 of each lock member 90.

Still further, on the upper surface of the brake member 80, outside the guide portions 84 and engagement projections 86, a flat surface 80A is provided in an annular form which is adapted to be engaged with a lower end of a compression coil spring 78, which serves as a biasing member, when the recording tape cartridge has been assembled.

Furthermore, at a center portion of the lower surface of the brake member 80 is projectingly provided a generally columnar operation projection 88 which can be inserted through the through hole 48A and disposed in contact with a release projection 104 which is projectingly provided at an axial center portion of the rotary shaft 100 of the drive device (see FIGS. 3 and 4). It should be noted that the operation projection 88 has a height such that the operation projection 88 does not extend downward out of the through hole 48A (the bottom wall 48) (a height such that the operation projection 88 is disposed within the through hole 48A), as shown in the drawing, thereby preventing the brake member 80 from being moved upward inadvertently.

Figure 6:
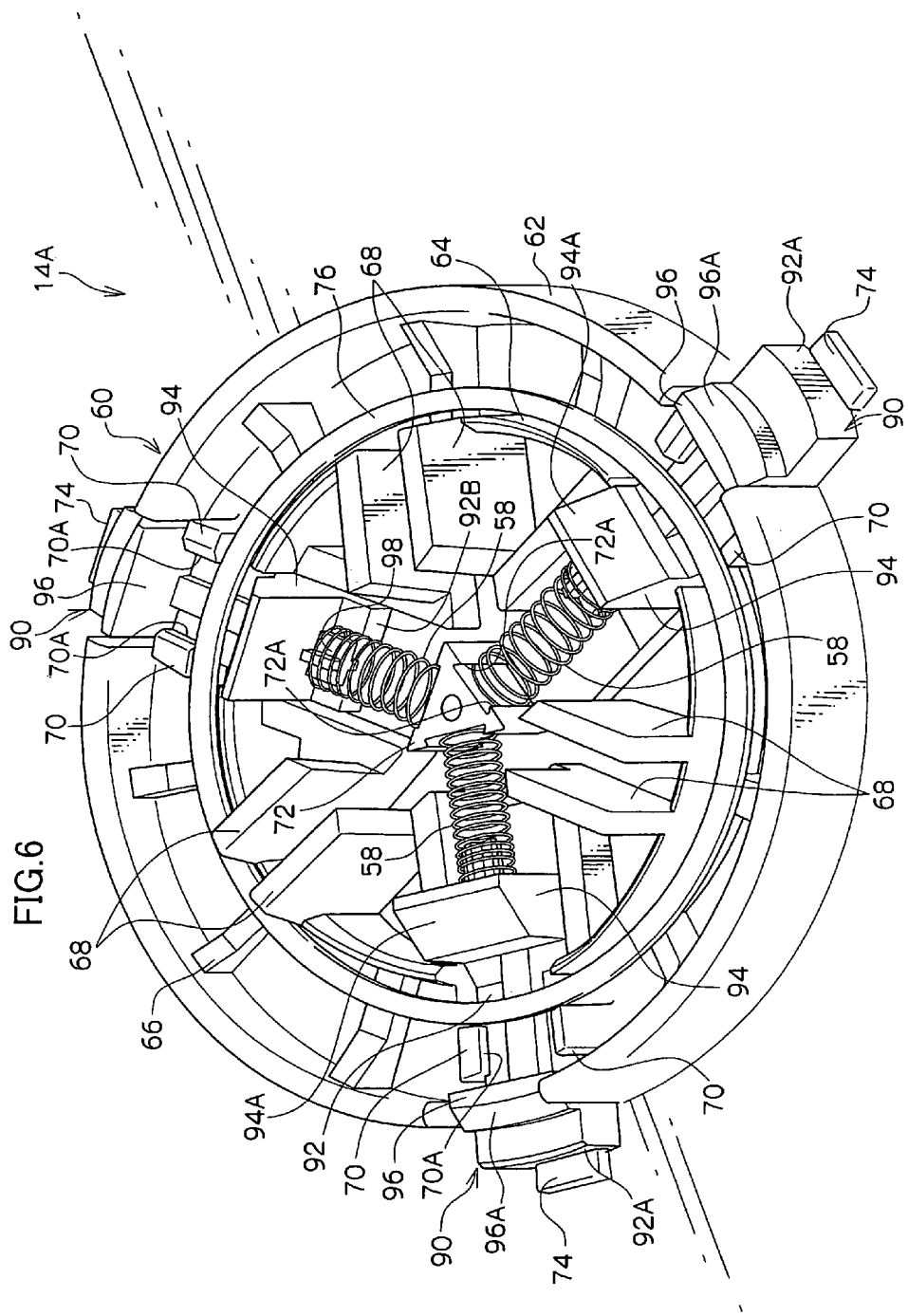
FIG. 6 is a perspective view schematically showing the state in which a lock member is accommodated in the attachment portion formed in an upper half case of the recording tape cartridge of the invention.

In addition to the brake member 80, FIG. 5 shows a mounting portion 60 provided in the upper case half 14, a lock member 90 housed in the mounting portion 60, a stopper member 76 which holds the lock member 90 to the mounting portion 60, and a compression ring 78 abutting on the stopper member 76. FIG. 6 shows the state in which the lock member 90 and the stopper member 76 are held by the mounting portion 60.

As shown in FIG. 6, the mounting portion 60 is formed in the substantially center (on shaft center of the hub 42) of the inner surface of the top plate 14A in the upper case half 14, and the mounting portion 60 houses the plural lock members 90 which block the movement of the reel 40 in the shaft direction (vertical direction). The plural lock members 90 engage the inner peripheral surface side of the upper edge portion of the hub 42.

The mounting portion 60 comprises two types of cylindrical walls 62 and 64 which are provided upright in the form of concentric outer and inner circles respectively, as seen in a plan view, the outer one of which is made higher than the inner one. The cylindrical walls 62 and 64 are notched at predetermined positions (at three positions spaced apart from each other at uniform intervals). Guide ribs 65 are provided upright inside of the notched portions of the cylindrical walls 64 in such a manner as to extend in radial directions. The lock members 90 are radially slidably accommodated in accommodation portions 63 defined between the guide ribs 65.

A plurality of (nine in this embodiment) plate-like support ribs 66 are provided upright between the cylindrical walls 62 and 64 in a manner to interconnect the cylindrical walls 62 and 64. Further, between the respective accommodation portions 63 and inside of the cylindrical walls 64 are provided in pairs guide wall portions 68 between which the guide portions 84 of the brake member 80 are inserted, wherein the number of pairs of the guide wall portions 68 is equal to that of the guide portions. The pairs of the guide wall portions 68 are projectingly provided in a manner to extend in radial directions so as to be flush at outer end surfaces thereof with the outer peripheral surfaces of the cylindrical walls 6, and the space between the guide wall portions 68 of each pair is made substantially equal to or slightly larger than the thickness of each guide portion 84.

Further, pairs of holding portions 70 are projectingly provided between the cylindrical walls 62 and 64 and at opposite sides of the accommodation portions 63, each pair of the holding portions 70 being adapted to hold a respective one of the lock members 90 slidably (with a small gap). On the leading ends (lower end) of the holding portions 70 of each pair are provided undercut portions 70A which are formed as projections extending inward with respect to each other (toward the lock member 90), as shown in FIGS. 5 and 6.

The holding portions 70 serve to temporarily support the lock members 90 to such an extent as to prevent the lock members 90 from dropping down (being removed) from the mounting portion 60 (from the accommodation portions 63) when the upper case half 14 is turned upside down so that the inner surface of the top plate 14A faces down and covers the lower case half (during the assembly of the case 12), after each of the lock members 90 has been incorporated in place.

Further, an engaging protrusion 72 which holds one end of a coil spring 58 is provided in the substantially center (on shaft center of the hub 42, and the center of the mounting portion 60) of the inner surface of the top plate 14A. The coil spring 58 is provided in each lock member 90 (three coil springs in the embodiment), and each lock member 90 is always urged from the center of the mounting portion 60 (center of the reel 40) toward the outside in the radial direction.

The engaging protrusion 72 is formed substantially in a triangle pole so as to be able to hold the three coil springs 58, respectively. A pair of engaging pawls 72A is formed over a total height while facing to each other in both end portions on the side face of the engaging protrusion 72. The pair of engaging pawls 72A can hold the coil spring 58 by engaging the coil spring 58 from the both side.

Further, stopper ribs 74 are projectingly provided on the top plate 14A at predetermined positions on lines of extension from the accommodation portions 63 outside of the cylindrical wall 62 (at positions where a certain amount of tension described below can be applied). The stopper ribs 74 are adapted to serve as position regulating means for temporarily retaining the lock members 90 biased by the coil spring 58 (until the upper case half 14 is attached to the lower case half 16) when the lock members 90 and coil spring 58 are incorporated. Consequently, since the lock members 90 are supported while being applied with a certain amount of tension by the coil spring 58 and stopper ribs 74, the lock members 90 can be more effectively prevented from dropping down. Therefore, the lock member 90 can easily be incorporated into the mounting portion 60.

Figure 7:
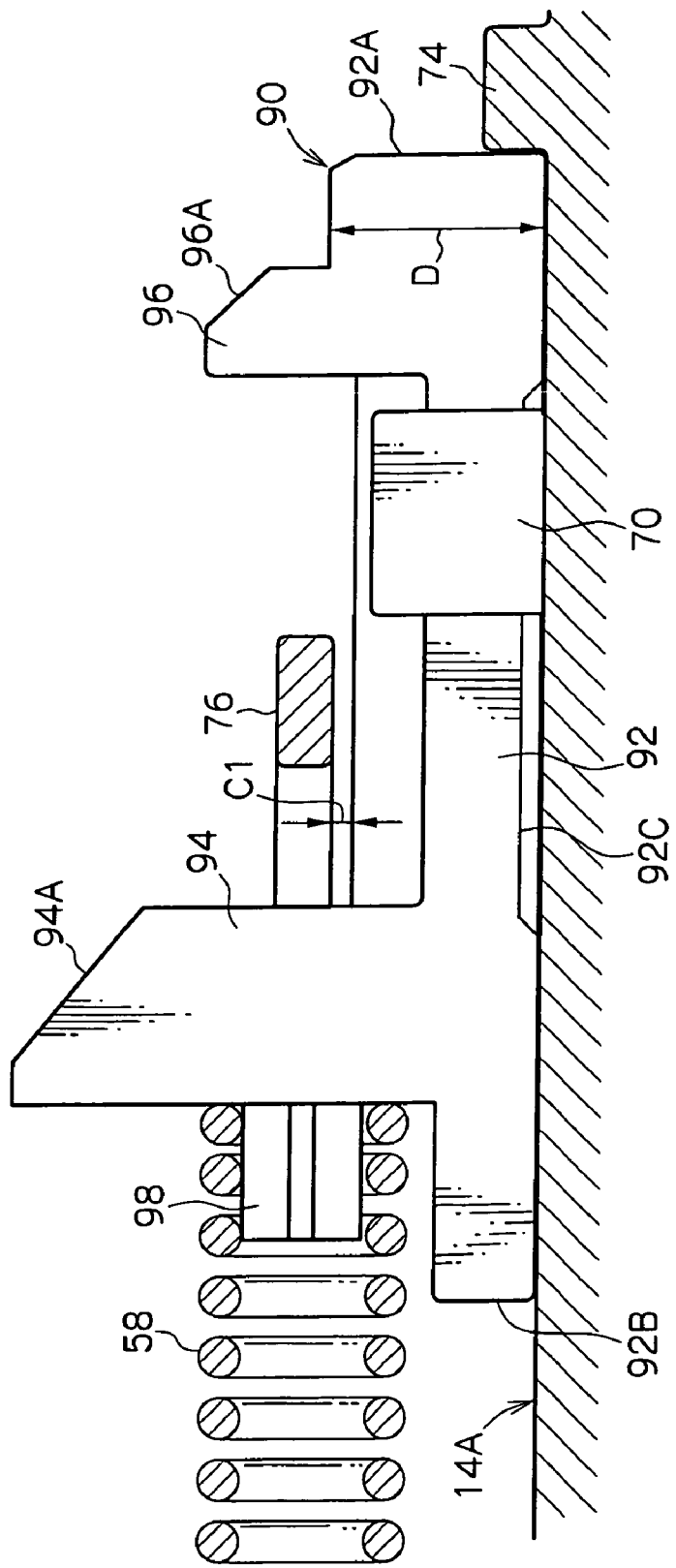
FIG. 7 is a side view schematically showing the lock member held by a holding portion of the recording tape cartridge of the invention.

After the lock members 90 are temporarily supported by the holding portions 70, a ring-shaped stopper member 76 formed from a plastic material is welded on the supporting ribs 66 by means of ultrasonic waves or the like. A predetermined clearance C1 (C1=about 0.05 mm-0.4 mm) is secured between the stopper member 76 and the lock members 90 in order not to hinder the lock members 90 when the lock members 90 are caused to slide, as shown in FIG. 7.

In a body portion 92 of the lock member 90, it is preferable that recesses (or projections) are formed at an upper surface which is in contact with the inner surface of the top plate 14A of the upper case half 14 and at a lower surface which is in contact with the stopper member 76. When the recesses (or projections) are formed, contact areas between the lock member 90 and the inner surface of the top plate 14A of the upper case half 14 and the lock member 90 and the stopper member 76 can be decreased, so that the lock member 90 can slide with low resistance.

Further, when the recording tape cartridge 10 is assembled (when the upper case half 14 is placed over the lower case half 16), the compression coil spring 78 is engaged at the upper end thereof with the stopper member 76, so that the compression coil spring 78 is held between the stopper member 76 (the upper case half 14) and the flat surfaces 80A (the brake member 80).

The upper end of the compression coil spring 78 may be disposed in contact with the supporting ribs 66 instead of with the stopper member 76. The stopper member 76 is not limited to a ring-like configuration shown in the drawings, and it is only required that the stopper member 76 be at least bridged between the supporting ribs 66 on the opposite sides of the lock members 90 so as to prevent the lock members 90 from dropping down all the time. An arrangement may be made such that it is possible that simply the stopper member 76 is provided while the holding portions 70 are omitted. An arrangement may also be made such that simply the holding portions 70 are provided while the stopper member 76 is omitted.

The lock members 90 are supported to be radially movable within the accommodation portions 63 while being prevented from dropping down by means of the holding portions 70 and the stopper member 76. Each of the lock members 90 includes a generally rectangular column-shaped body portion 92. A generally rectangular column-shaped cam portion 94, which has substantially the same width as that of the body portion 92, is integrally provided, projecting substantially in an axial direction of the reel 40, on a radially inward end portion 92B of each body portion 92.

A fit-in portion 98 with a predetermined length is projected toward the inside in the radial direction of the cam portion 94. The fit-in portion 98 is fitted into the other end of the coil spring 58 while the fit-in portion 98 has a cross shape in a cross-section. An outer diameter of is formed slightly larger than an inner diameter of the coil spring 58 such that the coil spring 58 does not disengage fit-in portion 98. In the body portion 92, an end portion 92B, which is located radially inside the cam portion 94, is extended radially inward with a predetermined length (such that the end portion 92B is slightly longer than the fit-in portion 98).

Accordingly, since a center of gravity of the lock member 90 is situated to the body portion due to the shape, when the lock member 90 and the coil spring 58 are incorporated into mounting portion 60 (accommodation portion 63) and held between the engaging protrusion 72 and the stopper rib 74, so that fly-out of the lock member 90 from the mounting portion 60 (accommodation portion 63) by the tension of the coil spring 58 can further be prevented. That is, this configuration enables the lock member 90 and the coil spring 58 to be easily incorporated into the mounting portion 60.

In an outward side of the lower end surface of the cam portion 94, a tapered surface (cam surface) 94A is formed with inclination ranging from 30 degrees to 60 degrees, preferably 45 degrees. The tapered surface 94A engages a tapered surface 86A of an engagement projection 86 of the brake member 80. Since both the engagement projection 86 and the cam portion 94 are formed in substantially rectangular column shape, rigidity is high and the engagement projection 86 and the cam portion 94 can preferably engage with each other.

FIG. 7 is a reel-shaft-direction sectional view showing the lock member incorporated into the top plate 14A through the mounting portion 60. A thickness D (see FIG. 7) of the radially outward end portion 92A of the lock member 90 is formed substantially equal to a distance W (see FIG. 3) between the upper face of the upper flange 44 and the inner surface of the top plate 14A when the reel 40 is located at the lowest position in the case 12.

In the vicinity of the radially outward end portion 92A is integrally provided an engagement portion 96 which extends axially of the reel 40 (vertically) and has a predetermined height adapted to be engaged with the upper edge portion of the reel hub 42. The engagement portion 96 has a width the same as that of the body portion 92 and extends less than the cam portion 94. An outward portion of the lower end surface of the engagement portion 96 is configured as a tapered surface 96A inclined at a predetermined angle. The outer surface including the tapered surface 96A is made to be an arcuate surface which is in registration with the inner peripheral surface of the reel hub 42 as seen in a plan view.

Thus, the lock member 90, which is temporarily retained by the stopper rib 74, is configured such that the engagement portion 96 can be readily engaged with the upper edge portion of the reel hub 42 during the operation when the recording tape cartridge is assembled (when the upper case half 14 is placed to cover the lower case half 16). After engagement, the radially outward end portion 92A of the body portion 92 is spaced apart from the stopper rib 74, as shown in FIG. 3.

Figure 8:
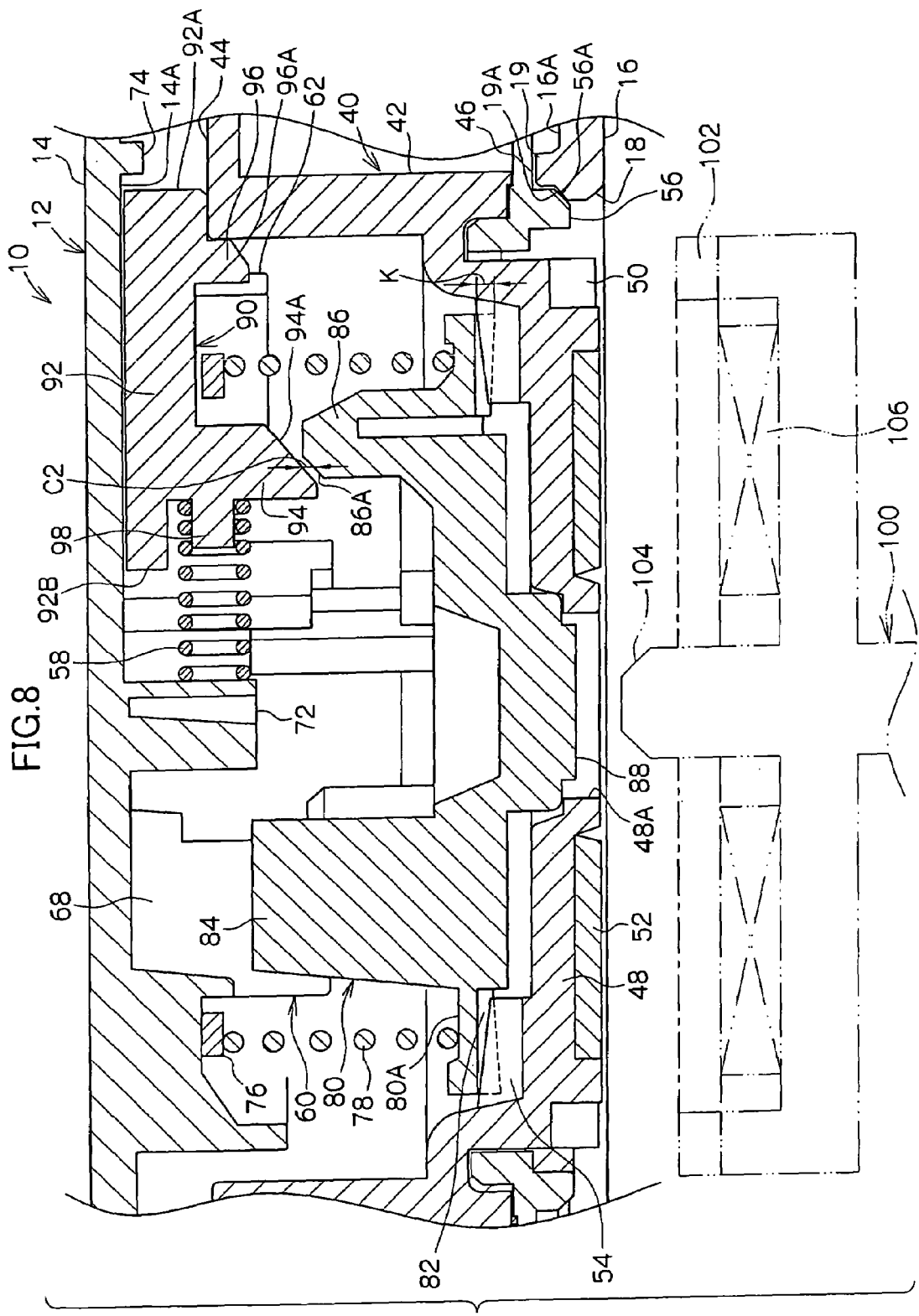
FIG. 8 is a partially enlarged sectional side view schematically showing the state of the recording tape cartridge of the invention before the rotary shaft rises.

With the above-described arrangement, when the recording tape cartridge is in non-use, the brake member 80 is downwardly biased due to a biasing force of the compression coil spring 78, while the lock members 90 are biased radially outwardly due to a biasing force of the coil spring 58, as shown in FIG. 3 and FIG. 8. Consequently, the brake member 80 is prevented from rotating with respect to the case 12 because of the guide portions 84 being inserted between the guide wall portions 68, and the reel 40 is prevented from being rotated because of the brake gear 82 of the brake member 80 being strongly meshed with the engagement gear 54 in the hub 42.

The engagement portion 96 of the lock member 90 engages an upper edge portion of the hub 42, which allows the outside surface except for the tapered surface 96A of the engagement portion 96 to press the inner peripheral surface of the hub 42. Since the thickness D of the outside end portion 92A of the lock member 90 (body portion 92) is substantially equal to the distance between the upper face of the upper flange 44 and the inner surface of the top plate 14A, the end portion 92A is located between the upper face of the upper flange 44 and the inner surface of the top plate 14A, which prevents the rise of the reel 40 when the recording tape cartridge 10 is not used.

That is, even if shock is applied to the recording tape cartridge 10 due to fall or the like, the reel 40 does not rise.

When the recording tape cartridge is in non-use, the engagement projection 86 and the cam portion 94 are disposed out of contact with each other so as to prevent the component force of the coil spring 58 from acting on the brake member 80. The clearance C2 between the opposing tapered surfaces 86A and 94A in the axial direction of the reel 40 (in the direction of movement of the brake member 80) is made smaller than an amount of meshing K between the brake gear 82 and the engagement gear 54 (in other words, than an ascending stroke of the brake member 80 until the meshing between the brake gear 82 and the engagement gear 54 is released).

When the clearance C2 is larger than the amount of meshing K, the brake member 80 rises by the shock due to the fall or the like while exceeding the amount of meshing K, and the meshing between the brake gear 82 and the engagement gear 54 is released to enable the reel 40 to be rotated. Accordingly, the clearance C2 between the engagement projection 86 and the cam portion 94 is extremely small, and thereby the reel 40 and the brake member 80 cannot rise substantially (cannot be moved in the shaft direction of the reel 40) during nonuse of the recording tape cartridge 10, which prevents the reel 40 from rotating.

Figure 11:
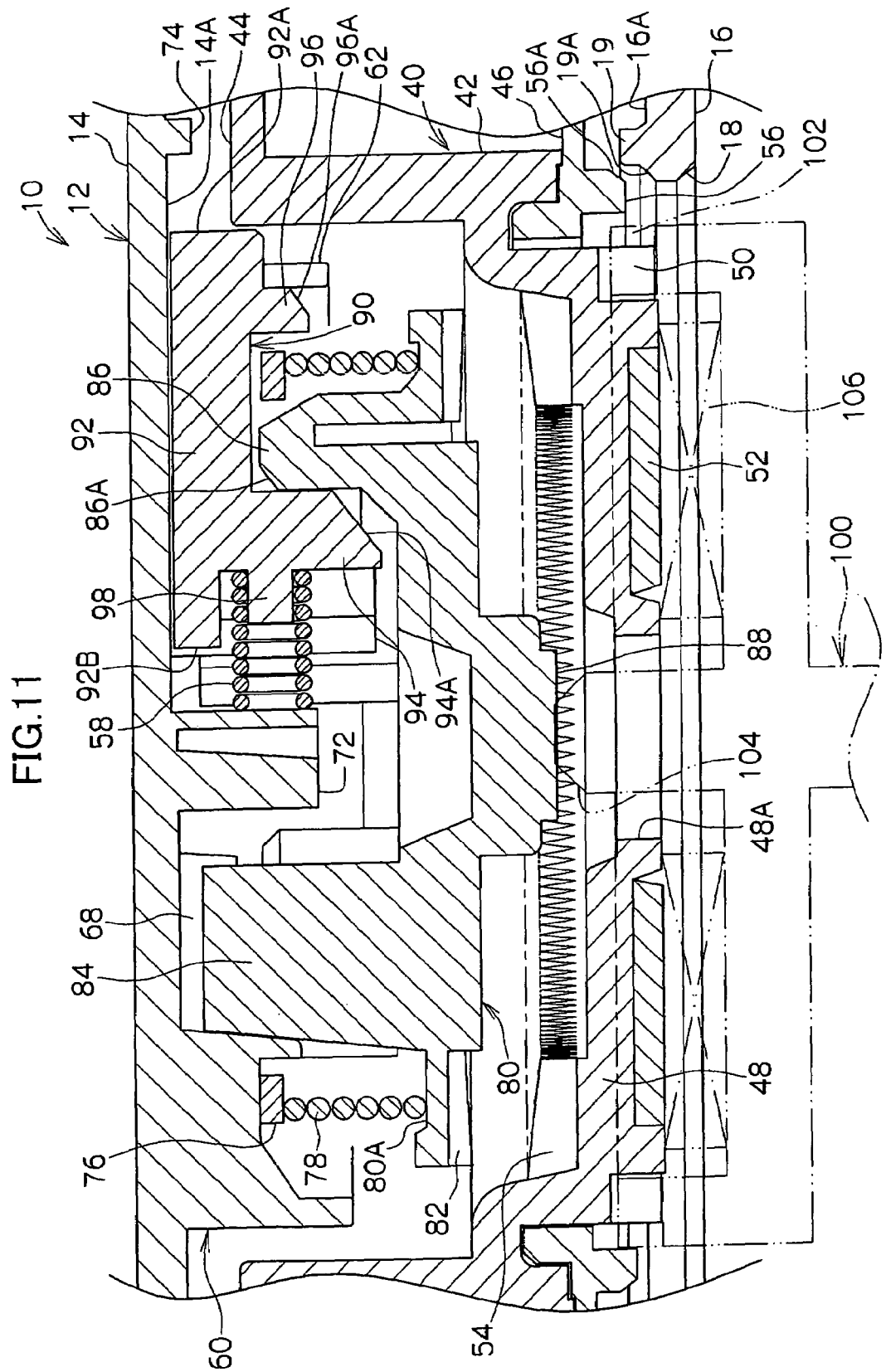
FIG. 11 is a partially enlarged sectional side view schematically showing the state of the recording tape cartridge of the invention after the rotary shaft rises.

On the other hand, during the use of the recording tape cartridge 10, as shown in FIGS. 4 and 11, the brake member 80 is pushed up to release the meshing between the brake gear 82 and the engagement gear 54 by a release projection 104 of a rotary shaft 100. The lock member 90 slides radially inward against the urging force of the coil spring 58 by the movement of the brake member 80, and the outside end portion 92A of the body portion 92 is retracted from the space between the upper surface of the upper flange 44 and the inner surface of the top plate 14A while the outside surface of the engagement portion 96 is separated from the inner peripheral surface of the hub 42. Therefore, the reel 40 can rise to a predetermined height in the case 12.

As shown in FIG. 11, when the brake member 80 rises, the cam portion 94 intrudes inside the engagement projection 86. At this point, only the outside surface of the cam portion 94 abuts on the inside surface of the engagement projection 86, the upper end surface of the engagement projection 86 does not abut on the lock member 90 nor does the lower end surface of the cam portion 94 abut on the brake member 80. Therefore, the pressing force (urging force) in which the lock member 90 is pressed by the coil spring 58 is received in the inner peripheral surface of the engagement projection 86, and a component of the force in which the brake member 80 is pressed downward is not generated.

That is, in rotating the reel 40, the pressing force (urging force) generated by the coil spring 58 acts only in the radial direction of the reel 40, and the pressing force does not act in the shaft direction (vertical direction) of the reel 40. Therefore, the lock member 90 is stably held in an unlocked state with respect to the reel 40. Because the pressing force (urging force) in the shaft direction (vertical direction) of the reel 40 is applied only by the compression coil spring 78, even if the coil spring 58 is provided, a load of the coil spring 58 is not applied to the brake member 80 in the shaft direction (downward direction) of the rotary shaft 100.

Description will next be made of the operation of the recording tape cartridge 10 constructed as described above. As shown in FIG. 1, with the recording tape cartridge 10, when it is in non-use (when it is not loaded into a drive device), the opening 20 is closed with the door 30 due to a biasing force of the torsion spring 28.

As shown in FIG. 2, the protrusion 22B of the leader tape 22 is housed (inserted) and held in the slot portions 24, which allows the leader tape 22 to be arranged along the left sidewall 12B.

When recording data onto the recording tape T of the recording tape cartridge 10 or reproducing data recorded on the recording tape T, the recording tape cartridge 10 is loaded into a drive device (not shown). More specifically, the recording tape cartridge 10 is inserted from the front wall 12A side into a loading slot (not shown).

In response to the loading operation, the opening/closing member of the drive device approaches relative to and engages with a right end portion of the door 30 (on the right hand side relative to the fulcrum shaft 25), thereby pressing the right end portion. Consequently, the door 30 is rotated about the fulcrum shaft 25 against a biasing force of the torsion spring 28 so that the opening 20 is opened.

When the opening 20 is opened with the door 30 rotated, the draw-out member of the drive device is made to approach from the left side wall 12B side to the opening 20 and engaged with the aperture 22A of the leader tape 22. At this point, the leader tape 22 is in a standby position while being alongside the left side wall 12B, so that the draw-out member can be surely engaged with the aperture 22A.

With the draw-out member engaged with the aperture 22A, the leader tape 22 is drawn out of the case 12 in response to the draw-out member being moved from the opening 20. Subsequently, the leader tape 22 as drawn out of the case 12 is wound onto a take-up reel of the drive device.

Figure 9:
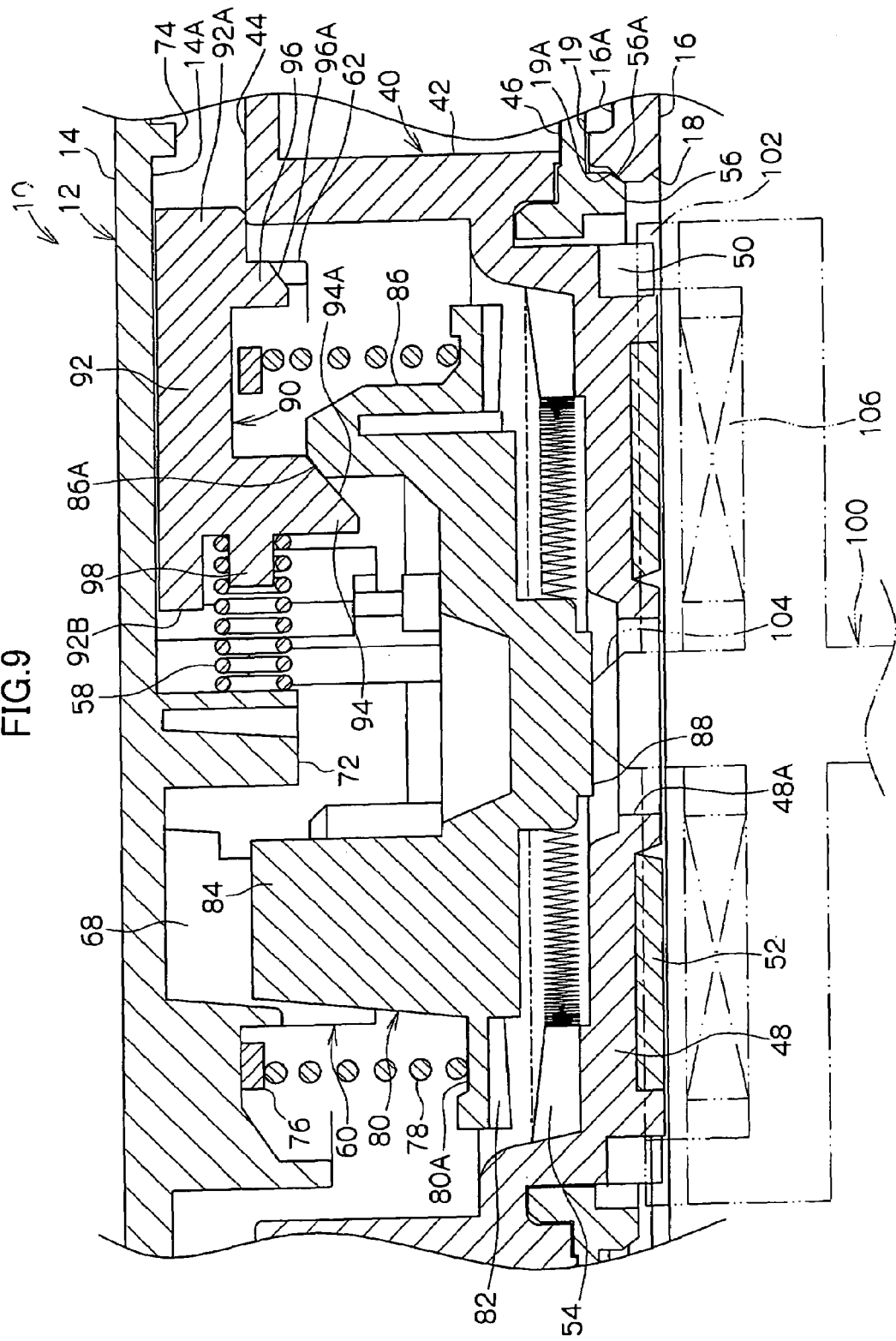
FIG. 9 is a partially enlarged sectional side view schematically showing the state of the recording tape cartridge of the invention while the rotary shaft rises.

On the other hand, as shown in FIG. 9, the rotary shaft 100 of the drive apparatus proceeds from the gear opening 18 of the case 12, and the release projection 104 abuts on an operation protrusion 88 to press the operation protrusion 88 upward. Then, the brake member 80 rises against the urging force of the compression coil spring 78, and the engagement projection 86 abuts on the cam portion 94 of the lock member 90 to press the cam portion 94 upward.

Thereby, the tapered surface 94A of the cam portion 94 slides on the tapered surface 86A of the engagement projection 86, and the lock member 90 starts to slide toward the inner surface of the top plate 14A radially inward against the urging force of the coil spring 58. At this point, since the recess (or projection) is formed in the body portion 92 of the lock member 90, the lock member 90 can slides with little resistance. Further, the lock member 90 can stably slide without disengagement of the lock member 90 from the accommodation portion 63 (mounting portion 60) due to the stopper member 76.

Figure 10:
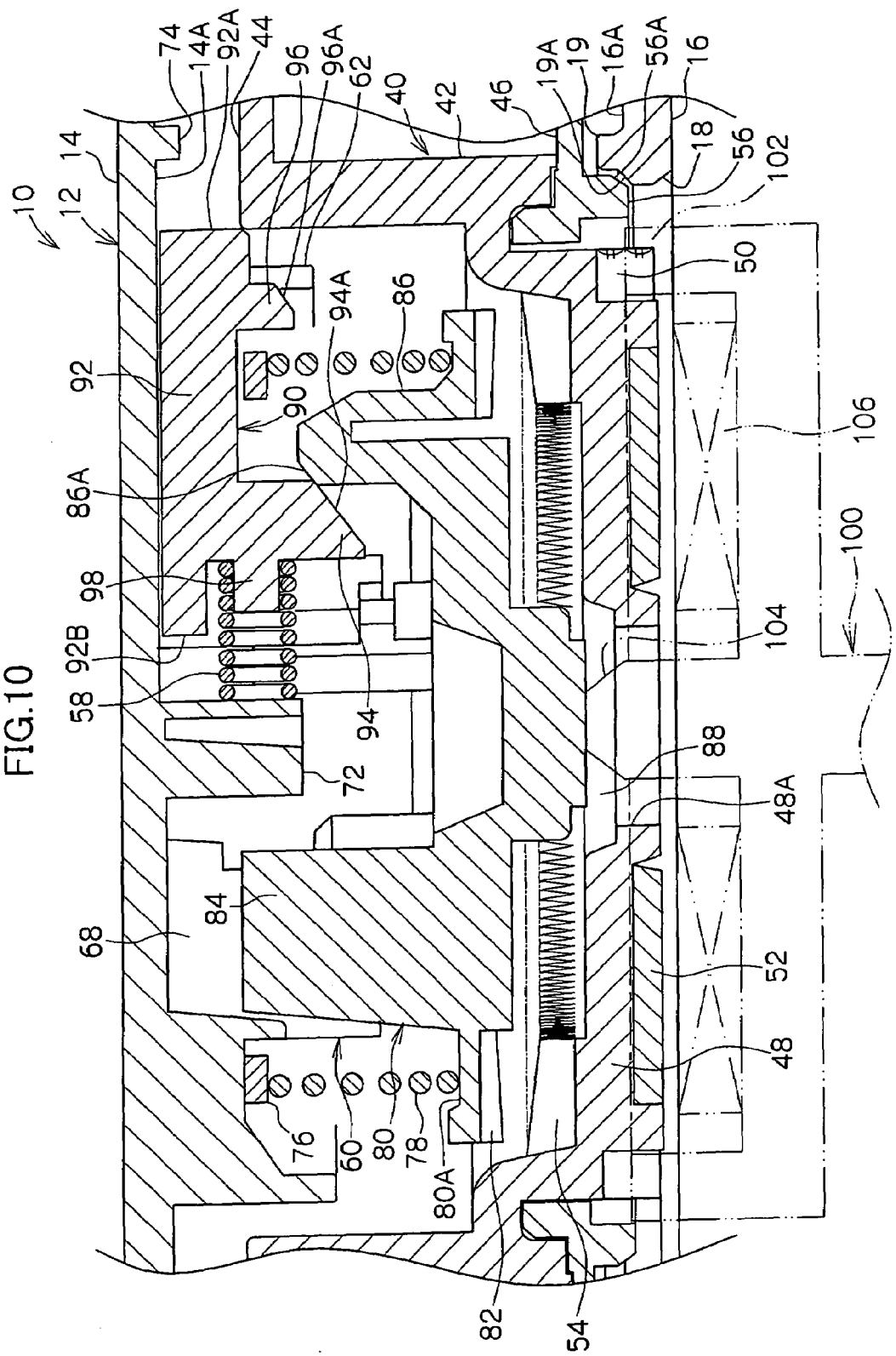
FIG. 10 is a partially enlarged sectional side view schematically showing the state of the recording tape cartridge of the invention while the rotary shaft rises.

Thus, when the lock member 90 starts to slide radially inward in the accommodation portion 63, the outside surface of the engagement portion 96 of the lock member 90 is separated from the inner peripheral surface of the hub 42, and the outside end portion 92A of the body portion 92 starts to be retracted from the space between the upper surface of the upper flange 44 and the inner surface of the top plate 14A toward the reel shaft. While the meshing between the engagement gear 54 and the brake gear 82 is released, a drive gear 102 starts to mesh with the reel gear 50. As shown in FIG. 10, when the amount of meshing between the reel gear 50 and the drive gear 102 reaches a substantially half of a gear tooth height, the lock member 90 is completely retracted from the space between the upper surface of the upper flange 44 and the inner surface of the top plate 14A.

The outside end portion 92A is arranged inside the hub 42, and the reel 40 starts to rise as the rotary shaft 100 rises. The drive gear 102 meshes completely with the reel gear 50, and a magnet 106 attracts a reel plate 52, which allows the rotary shaft 100 further to rise to a predetermined height as shown in FIGS. 4 and 11. Therefore, the cam portion 94 invades inside the engagement projection 86, the outside surface of the cam portion 94 abuts on the inside surface of the engagement projection 86, and the lock member 90 is held in the unlock state with respect to the reel 40. Then, the reel 40 is rotated at the position of the predetermined height.

When the drive gear 102 of the rotary shaft 100 rotates the reel gear 50 of the reel 40 in synchronization with a take-up reel, the recording tape T is sequentially fed toward the drive apparatus side, and the data recording or the reproduction of the recorded data is performed by the recording and reproduction head of the drive apparatus.

On the other hand, when the recording tape cartridge 10 is taken out from the drive apparatus, the drive gear 102 reversely rotates to rewind the recording tape T around the reel 40. Then, the leader tape 22 is taken off from the take-up reel, and the leader tape 22 is returned from the opening 20 into the case 12. That is, the protrusions 22B of the leader tape 22 are housed in the slot portions 24 and held at a predetermined position in the case 12.

Then, the reel 40 starts to descend by the descent of the rotary shaft 100, and the brake member 80 starts to descend by the urging force of the compression coil spring 78. This allows the urging force of the coil spring 58 to cause the lock member 90 to start to slide radially outward in the accommodation portion 63. That is, the tapered surface 94A of the cam portion 94 starts to slide on the tapered surface 86A of the engagement projection 86. The lock member 90 can also stably slide with small resistance.

When the rotary shaft 100 further descends, the magnet 106 is separated from the reel plate 52, and the meshing of the drive gear 102 with the reel gear 50 starts to be released. The outside end portion 92A of the lock member 90 (body portion 92) starts to be located between the upper surface of the upper flange 44 and the inner surface of the top plate 14A at the time when the amount of meshing between the reel gear 50 and the drive gear 102 is decreased to a substantially half of the gear tooth height.

That is, before the meshing of the drive gear 102 with the reel gear 50 is completely released (while the reel 40 is still supported by the rotary shaft 100), the lock member 90 is located between the upper surface of the upper flange 44 and the inner surface of the top plate 14A with holding the reel 40 between the lock member 90 and the lower case half 16 to block the rise of the reel 40. Then, when the rotary shaft 100 further descends to release the meshing of the drive gear 102 with the reel gear 50, the engagement portion 96 engages the upper edge portion of the hub 42. That is, the outside surface except for the tapered surface 96A of the engagement portion 96 presses the inner peripheral surface of the hub 42 by the urging force of the coil spring 58.

The tapered surface 86A of the engagement projection 86 is separated from the tapered surface 94A of the cam portion 94, and release projection 104 is separated from the operation protrusion 88. Then, the brake member 80 descends to the lowest position by the urging force of the compression coil spring 78, and the brake gear 82 meshes strongly with the engagement gear 54. Therefore, the rotation of the reel 40 is blocked again, the upper surface of the reel 40 is pressed while being not able to rise by the lock member 90, and the annular rib 56 vertically provided in the lower surface of the reel 40 is supported by the annular rib 19.

Thus, when the rotary shaft 100 is extracted from the gear opening 18, the recording tape cartridge 10 is discharged from a loading port of the drive apparatus, and the opening and closing member is separated from the right end portion of the door 30 in association with the discharge action. Then, the door 30 is rotated in the opposite direction about the fulcrum shaft 25 to close the opening 20 by the urging force of the torsion spring 28. The recording tape cartridge 10 in which the opening 20 is closed is discharged from the drive apparatus.

A low-capacity type recording tape cartridge 11 in which the winding amount of the recording tape T is decreased will be explained with reference to FIGS. 12 to 18. The low-capacity type recording tape cartridge 11 is configured to use same parts other than the reel 40 only by changing the reel 40 to the low-capacity type reel 41, and the production cost can be prevented to be increased.

The low-capacity type reel 41 will now be explained, other parts is designated by the same numeral as the recording tape cartridge 10, and the detailed description will be omitted as appropriate. In the reel 41, the part having the same function as the reel 40 is designated by the same numeral, and sometimes the description will be omitted. The material of the reel 41 is obviously the same material of the reel 40, and the resin material in which 20% glass fiber is added into polycarbonate is used. The young's modulus E are both set at 6000 MPa.

In the low-capacity type reel 41, the diameter of the hub 43 is formed larger than the hub 42 of the reel 40 to decrease the winding amount of the recording tape T. That is, the inner diameter of the hub 42 of the reel 40 is about 48 mm in the above embodiment while the inner diameter of the hub 43 of the reel 41 is about 87.7 mm in this embodiment.

Figure 12:
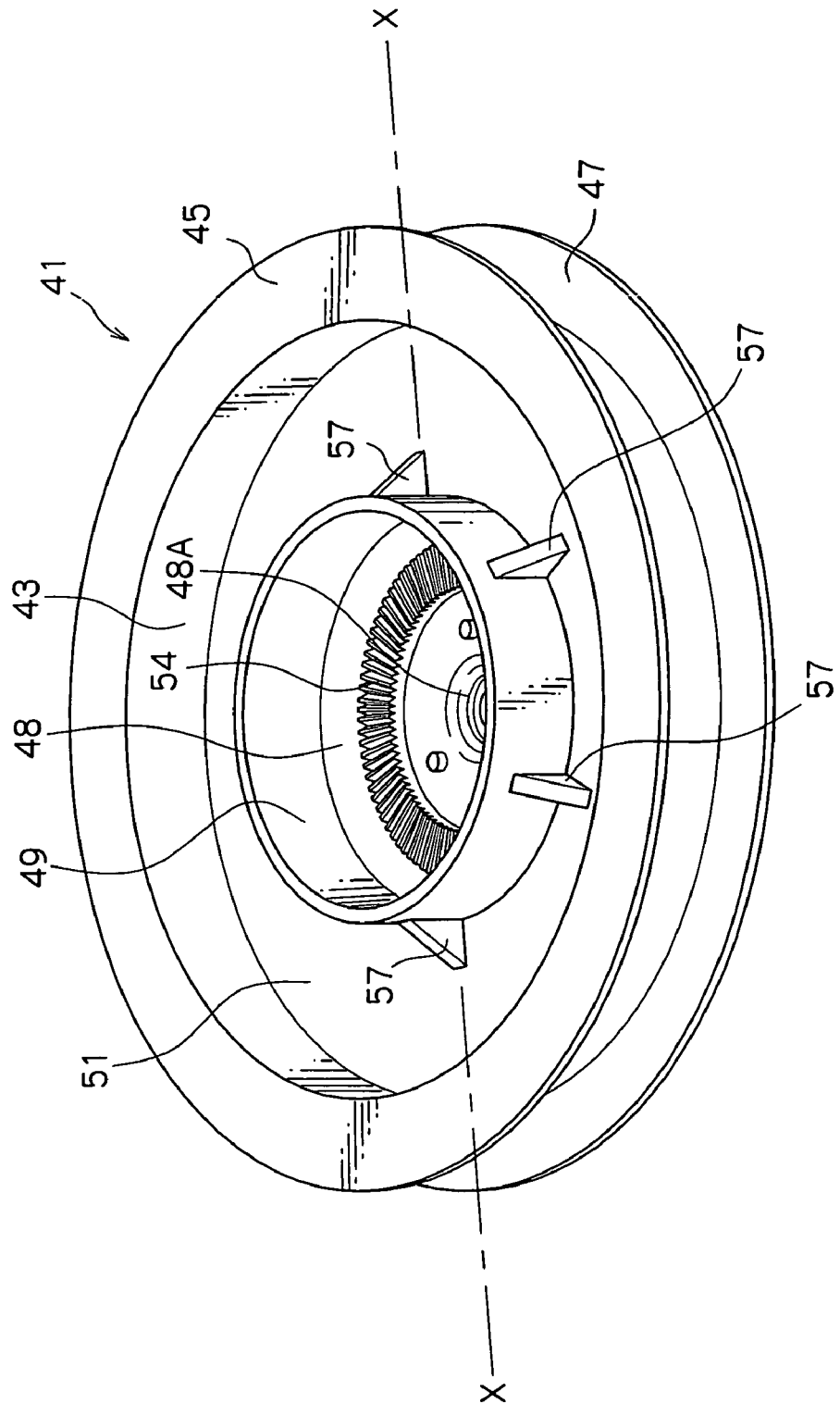
FIG. 12 is a perspective view schematically showing a reel of a low-capacity type recording tape cartridge according to the invention.
Figure 13:
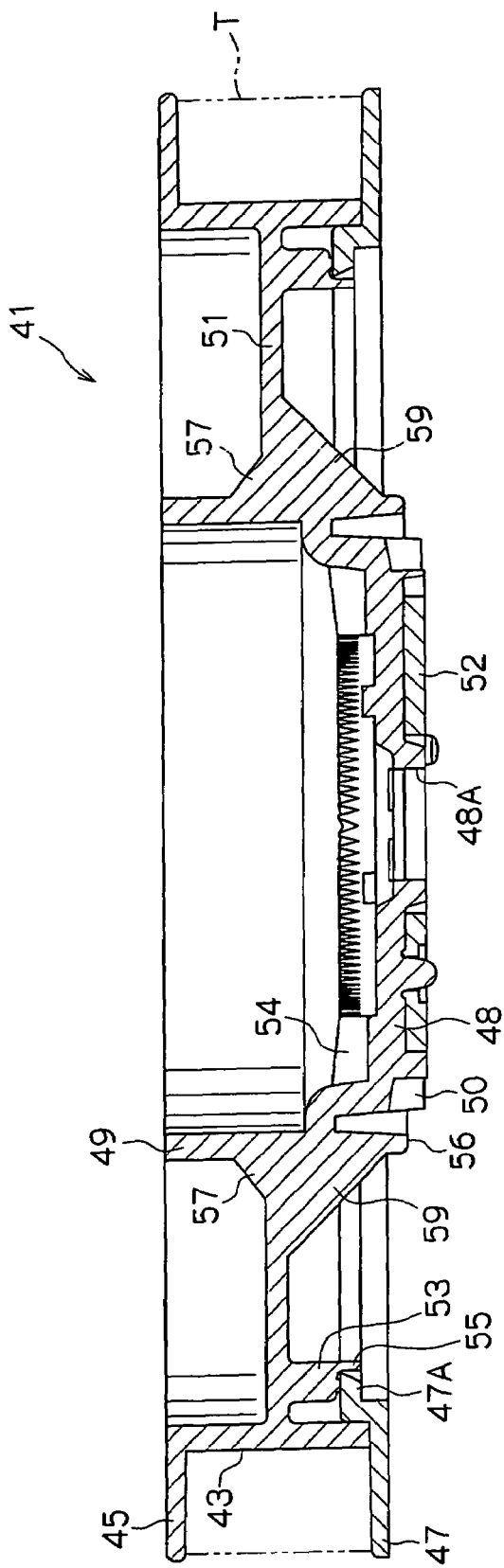
FIG. 13 is a schematic sectional side view taken on line X-X of the recording tape cartridge of the invention shown in FIG. 12.

As shown in FIGS. 12 and 13, the reel 41 has a cylindrical wall 49 with at least the inner diameter being equal to the hub 42 of the reel 40. That is, both the inner diameter of the reel 40 and the inner diameter of the cylindrical wall 49 are set at about 48 mm. The cylindrical wall 49 has the function similar to the hub 42 of the reel 40. The cylindrical wall 49 can accommodate the brake member 80, the compression coil spring 78, and the like, and the cylindrical wall 49 can engage the lock member 90. Accordingly, the height of the cylindrical wall 49 is equal to that of the hub 42 of the reel 40. A thickness of the cylindrical wall 49 is set at the range of about 1.4 mm to about 1.5 mm, and the strength against the lock member 90 is sufficiently secured.

The hub 43 of the reel 41 is joined to the cylindrical wall 49 by an annular joint portion 51. Namely, the annular joint portion 51 integrally joins the outer peripheral surface of the cylindrical wall 49 and the inner peripheral surface of the hub 43, and the thickness of the annular joint portion 51 is equal to or smaller than the thickness of the hub 43. That is, the thickness of the hub 43 is formed equal to or larger than the thickness of the annular joint portion 51.

In this embodiment, it is preferable that the thickness of the hub 43 ranges from about 1.8 mm to about 2.7 mm and the thickness of the annular joint portion 51 ranges from about 1.5 mm to about 2.5 mm. For example, both the thickness of the hub 43 and the annular joint portion 51 are molded at about 1.8 mm, or the thickness of the hub 43 is molded at about 2.7 mm and the thickness of the annular joint portion 51 is molded at about 2.2 mm. Therefore, the deformation of the hub 43 is prevented. The annular joint portion 51 preferably has the horizontally linear shape as shown in FIG. 13. However, the annular joint portion 51 may have the shape, which is bent at mid point.

Figure 14:
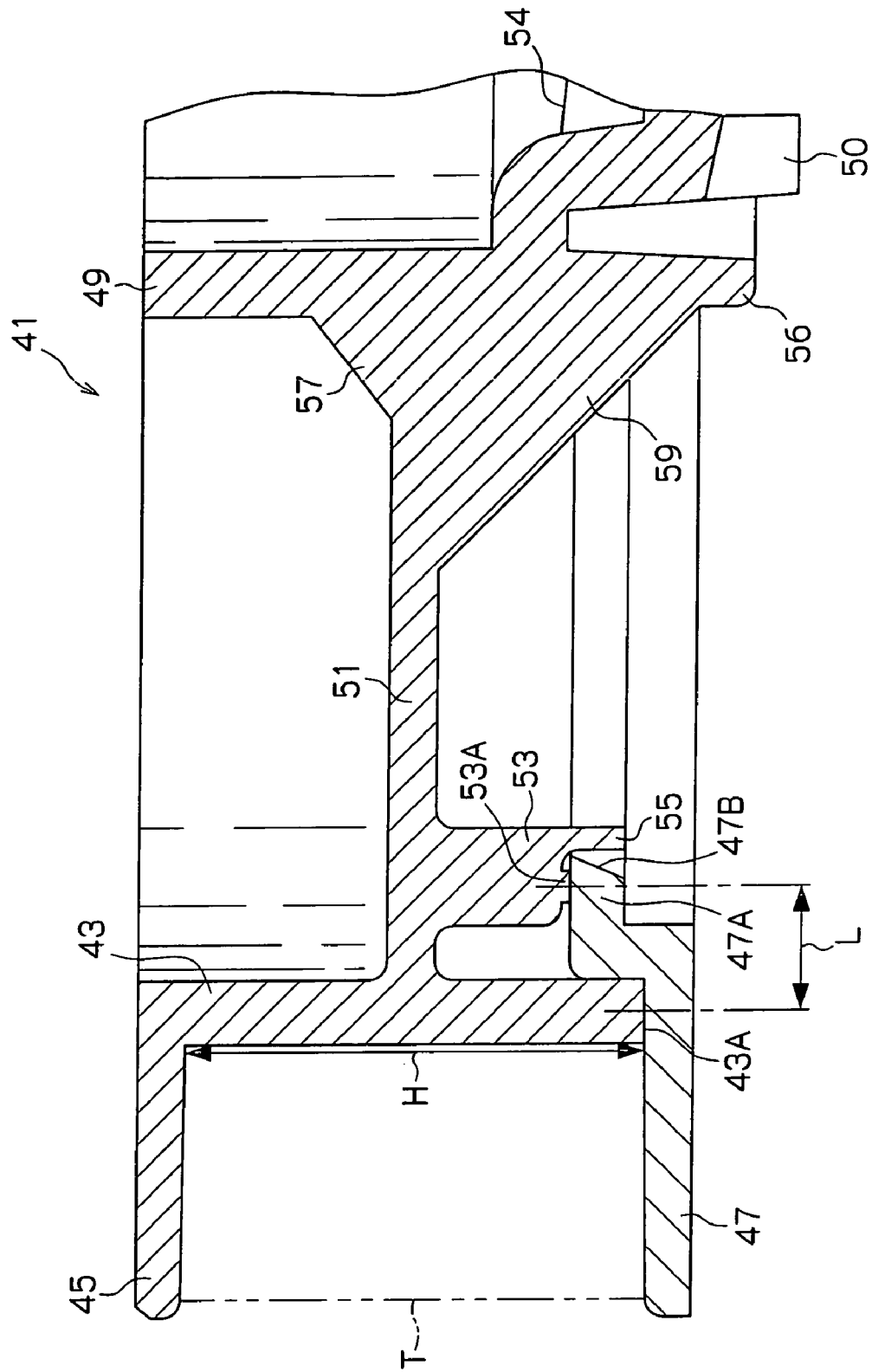
FIG. 14 is a partially enlarged schematic sectional side view of the recording tape cartridge of the invention shown in FIG. 13.

As shown in FIG. 14, the bottom wall 48, the cylindrical wall 49, the annular joint portion 51, the hub 43, and the upper flange 45 are integrally formed. The position of the annular joint portion 51 joined to the hub 43 is set at a half of an interval between an upper flange 45 and a lower flange 47 in the outer peripheral surface of the hub 43 or set to the side of the lower flange 47. In consideration of the strength of the hub 43, the joint region of the annular joint portion 51 to the hub 43 is desired at the lower end portion of the hub 43. However, the resin material injected from a gate (not shown) which is provided in the bottom wall 48 does not preferably flows to the upper flange during the molding. Therefore, the joint region of annular joint portion 51 is configured as the above in order to preferably obtain the strength of the hub 43 while preferably securing the flow path of the resin material As shown in FIGS. 12 and 13, plural reinforcing ribs 57 and 59 (for example, each six ribs, see FIG. 15) are arranged at even intervals while vertically located at the same positions between the outer peripheral surface of the cylindrical wall 49 and the upper and lower surfaces of the annular joint portion 51. The reinforcing rib 57 on the upper surface side differs from the reinforcing rib 59 on the lower surface side in the size, and the reinforcing rib 59 is formed larger than the reinforcing rib 57. The reinforcing ribs 57 and 59 improve the joint strength between the cylindrical wall 49 and the annular joint portion 51 to improve drop impact resistance, and the reinforcing ribs 57 and 59 preferably secure the resin-material flow path from the cylindrical wall 49 to the annular joint portion 51 during the molding.

As shown in FIGS. 13 and 14, the upper flange 45 and the lower flange 47 are provided in the upper and lower end surfaces of the hub 43 respectively. That is, the upper flange 45 is integrally formed with the hub 43 and the annular joint portion 51, and the lower flange 47 is solvent-welded to an annular convex 53 provided at the annular joint portion 51. An annular protrusion 47A protruded inward is extended at the upper end of the inner peripheral surface of the lower flange 47, and the upper surface of the annular protrusion 47A is solvent-welded to the lower surface of the annular convex 53 by the ultrasonic. A solvent welding margin 53A is provided at the lower surface of the annular convex 53.

An annular protrusion 55 is provided downward at the annular convex 53, the inner end surface of the annular protrusion 47A is formed in a tapered surface 47B, which is extended and opened downward. The upper portion of the inner end surface of the annular protrusion 47A abuts on the outer peripheral surface of the annular protrusion 55 after the solvent welding, and a lower end surface 43A of the hub 43 abuts on the upper surface of the lower flange 47.

The above configuration enables runout of the lower flange 47 to be prevented during the ultrasonic solvent welding resulting in stably performing of the welding of the lower flange 47 to the annular joint portion 51. Further, because the annular protrusion 55 can receive the drop impact or the like applied to the lower flange 47, the drop impact resistance can be improved. In the embodiment, as shown in FIG. 14, the solvent welding margin 53A is preferably provided at the position where a distance L between the center of the solvent welding margin 53A and the center in the thickness direction of the hub 43 ranges from about 3 mm to about 5 mm. The solvent welding margin may be provided at the upper surface of the lower flange 47 instead of the annular joint portion 51.

As shown in FIG. 15, the outer diameters of the upper flange 45 and lower flange 47 of the reel 41 are formed equal to the outer diameters (about 103 mm) of the upper flange 44 and lower flange 46 of the reel 40. In other words, the maximum winding diameter of the recording tape T wound around the hub 42 of the reel 40 is equal to the maximum winding diameter of the recording tape T wound around the hub 43 of the reel 41. Similar to the recording tape cartridge 10, the leader tape 22 is accommodated in and held by the slot portions 24 during nonuse of the recording tape cartridge 11.

During nonuse of the recording tape cartridge 10 and recording tape cartridge 11, respective leader tape 22 (outermost peripheral recording tape T) drawn from the reel 40 and the reel 41 accommodated inside the oscillation regulating wall 17 is displaced substantially along the left sidewall 12B. Therefore, the displaced angle of the leader tapes 22 of the reel 41 to the slot portion 24 becomes equal to the displaced angle of the leader tape 22 of the reel 40 to the slot portion 24.

Accordingly, in the recording tape cartridge 11, a passage angle in which the drawing member of the drive apparatus engages the aperture 22A of the leader tape 22 does not vary when compared with the recording tape cartridge 10, and the passages of the leader tape 22 and the recording tape T of the recording cartridge 11 is similar to the passages of the recording tape cartridge 10 in the drive apparatus. That is, both the recording tape cartridge 11 having the reel 41 and the recording tape cartridge 10 having the reel 40 can be recorded and reproduced by the same drive apparatus.

In the recording tape cartridge 11, which accommodates the reel 41, since the winding amount of the recording tape T is smaller than that of the recording tape cartridge 10 which accommodates the reel 40, usually a weight of the whole reel is lightened. Therefore, the reel 41 is smaller than the reel 40 in a torque drawing the leader tape 22 and the recording tape T. A tension can obviously be controlled in the pieces of the drive apparatus of the previous embodiment and this embodiment.

Figure 16:
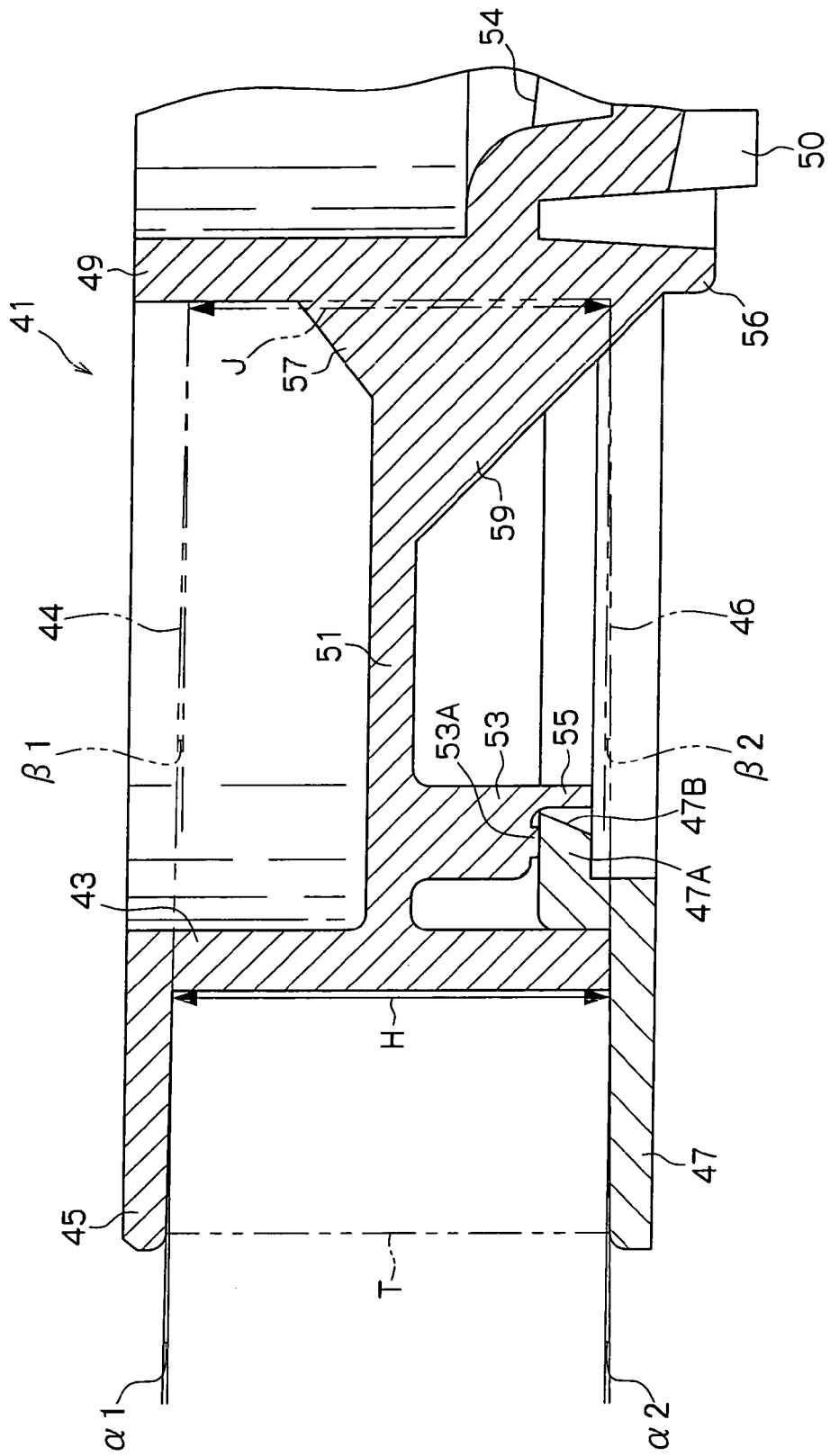
FIG. 16 is a partially enlarged schematic sectional side view explaining an upper flange and a lower flange of the recording tape cartridge of the invention.

As shown in FIG. 16, elevation angles α1 and α2 of the upper flange 45 and the lower flange 47 on the side where these flanges are faced to each other are respectively set equal to elevation angles β1 and β2, indicated by phantom lines, on the side where the upper flange 44 and the lower flange 46 of the reel 40 are faced to each other. The lower surfaces of the upper flanges 44 and 45 and the upper surfaces of the lower flanges 46 and 47 are formed in the tapered surface in which thickness is decreased radially outward in a side view. In the tapered surface, the differences in thickness between the inner peripheral portions and the outer peripheral portions of the flanges 44 and 46 are about 0.2 mm respectively, and the differences in thickness between the inner peripheral portions and the outer peripheral portions of the flanges 45 and 47 are about 0.1 mm respectively. Therefore, the elevation angles α1 and α2 of the upper flange 45 and the lower flange 47 are formed equal to the elevation angles β1 and β2 of the upper flange 44 and the lower flange 46 (α1=β1 and α2=β2) irrespective of the different diameters of the hub 43 and the hub 42. In this case, the interval H between the upper flange 45 and the lower flange 47 in the outer peripheral surface of the hub 43 of the reel 41 is larger than an interval J between the upper flange 44 and the lower flange 46 in the outer peripheral surface of the hub 42 of the reel 40 shown by the phantom lines (H>J). It is preferable that the interval H of the hub 43 of the reel 41 is formed larger than the interval J of the hub 42 of the reel 40.

When the interval H is equal to the interval J (H=J), the elevation angles α1 and α2 accordingly becomes larger than the elevation angles β1 and β2 (α1>β1 and α2>β2).

When the latter configuration (α1>β1 and α2>β2, H=J) is adopted, the margin between the upper end portion (edge) of the recording tape T and the upper flange 45 and the margin between the lower end portion (edge) o the recording tape T and the lower flange 47 are decreased compared with the case of the reel 40. Therefore, the vibrations of the upper and lower flanges 45 and 47 are increased, which is generated by an influence of LTM (Lateral Tape Motion) in which the recording tape T is wound while finely shifted in the vertical direction (width direction) or by the vibration of the hub 43 (runout of the hub 43 during the rotation of the reel 41). Such runout and the vibration of the hub 43 are caused since the recording tape T is wound while separated away farther from the rotary center of the reel compared to the reel 40 (the center of gravity of the wound recording tape T is shifted radially outward).

Therefore, it is preferable to adopt the former configuration (α1=β1 and α2=β2, H>J). Accordingly, the recording tape T can stably be wound while the upper and lower end portions (edges) of the recording tape T are preferably regulated by the flanges 45 and 47, and the vibration of the hub 43, i.e., the vibrations of the upper and lower flanges 45 and 47 can be decreased during the rotation of the reel 41.

As shown in FIG. 15, in order to identify by the drive apparatus or the like whether the recording tape cartridge 10 with the reel 40 or the recording tape cartridge 11 with the reel 41 is mounted, it is preferable that an RFID 108 in which the type of the reel, information on the recording tape T, production information, and the like are stored is mounted on the recording tape cartridge 10 and the recording tape cartridge 11.

As shown in FIG. 15, it is preferable that the RFID 108 is mounted in parallel with and inside of the front wall 12A of the case 12. When the RFID 108 is arranged at the above position, it is possible to immediately determine whether the recording tape cartridge 10 or the recording tape cartridge 11, when a recording tape cartridge is loaded in the drive apparatus.

The RFID 108 may be arranged in parallel with and inside of the rear wall 12E of the case 12. According to such an arrangement, before the recording tape cartridge 10 or the recording tape cartridge 11 is taken out from the library to be loaded in the drive apparatus, the information on the type of the recording tape cartridge can be transmitted to the drive apparatus, so that reception preparation such as tension change in drawing the leader tape 22 can be performed in the drive apparatus.

Then, the action of the low-capacity type recording tape cartridge 11 will be explained. The description similar to that for the recording tape cartridge 10 will be omitted as appropriate. The leader tape 22 is housed in the slot portions 24 during nonuse of the recording tape cartridge 11. Since the outer diameters of the upper and lower flanges 45 and 47 of the reel 41 are formed equal to those of the reel 40, the leader tape 22 (outermost peripheral recording tape T) drawn from the reel 41 is arranged substantially along the left sidewall 12B like the reel 40.

The recording tape cartridge 11 is loaded in the drive apparatus. The drive apparatus recognizes the recording tape cartridge 11 in which the reel 41 is accommodated with the RFID 108.

Figure 17:
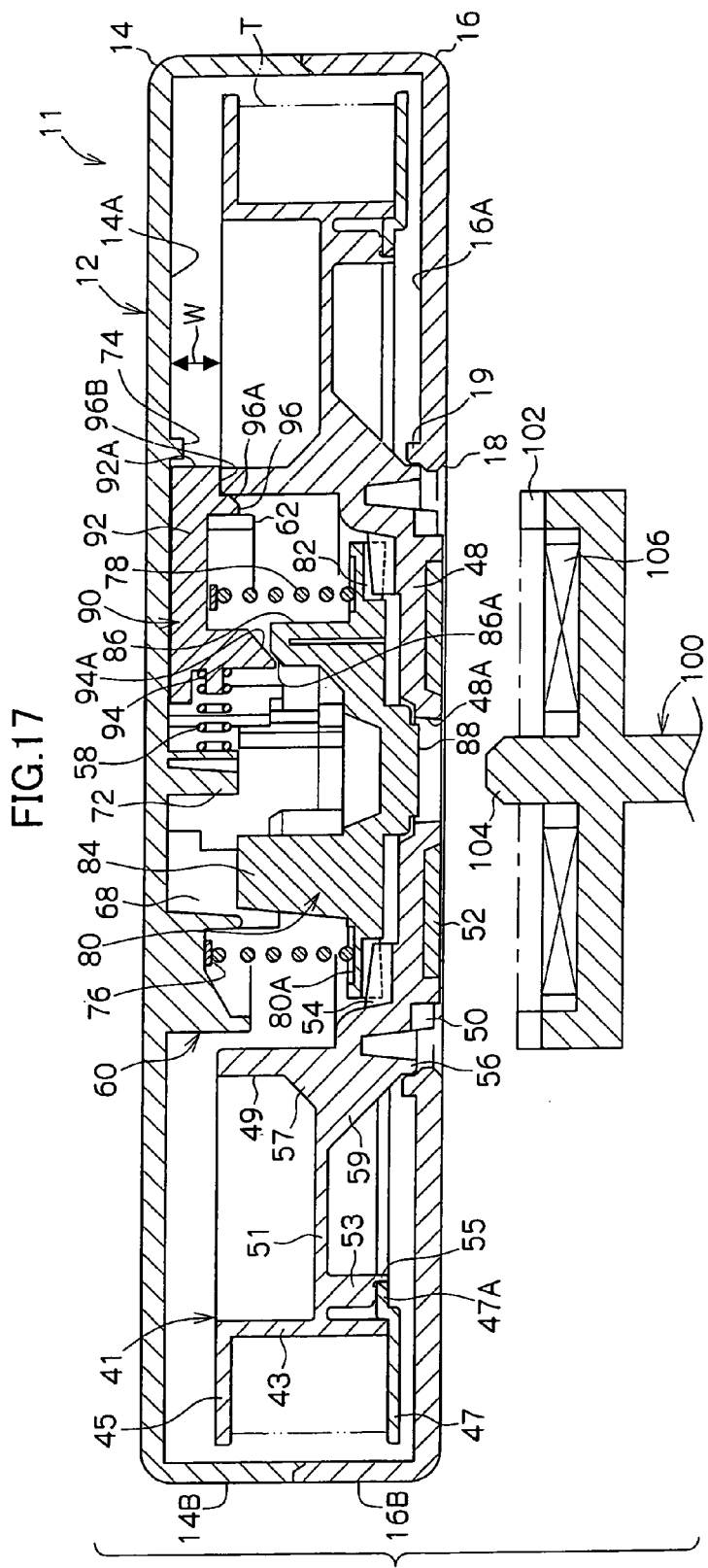
FIG. 17 is a sectional side view schematically showing the low-capacity type recording tape cartridge according to the invention before the rotary shaft rises.
Figure 18:
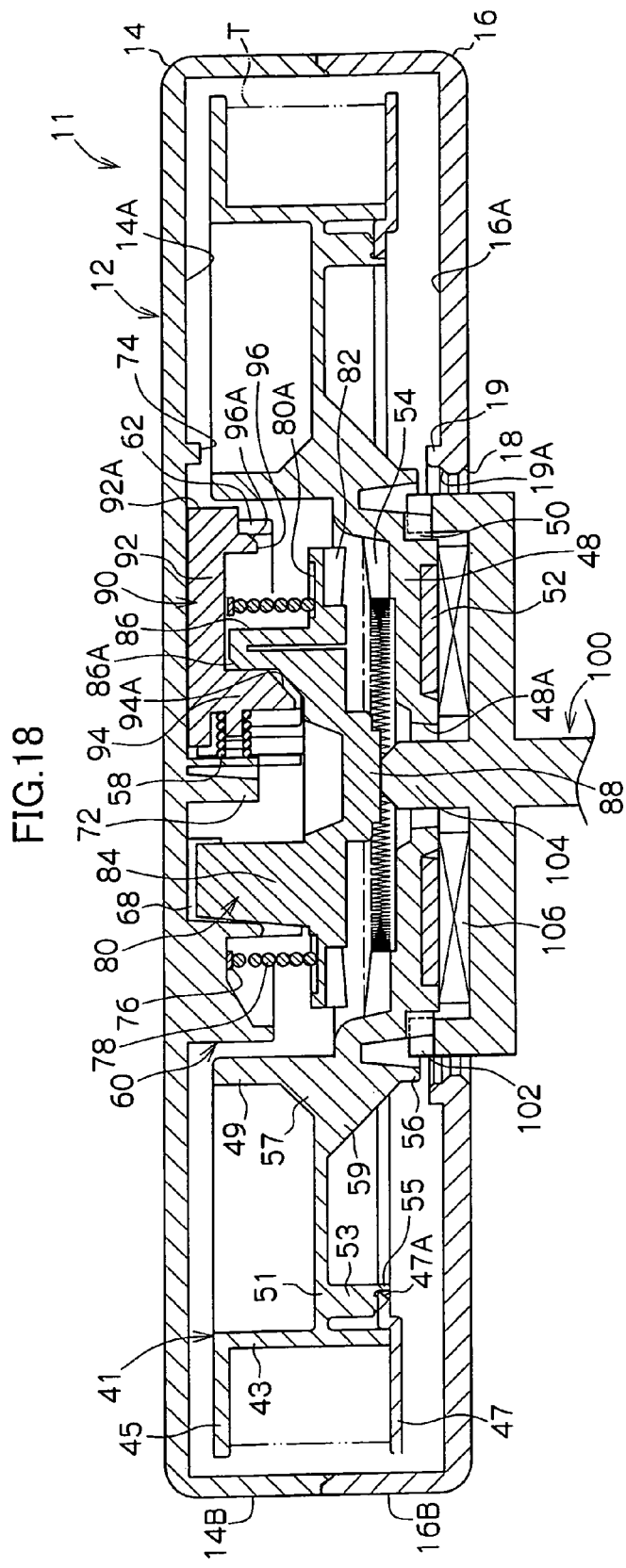
FIG. 18 is a sectional side view schematically showing the low-capacity type recording tape cartridge according to the invention after the rotary shaft rises.

When the recording tape cartridge 11 is loaded in the drive apparatus, the state shown in FIG. 17 is changed to the state shown in FIG. 18 like the recording tape cartridge 10. That is, the door 30 is opened by the opening and closing member (not shown) of the drive apparatus, the rotary shaft 100 invades from the gear opening 18, and the drive gear 102 meshes with the reel gear 50.

The brake member 80 rises in association with the meshing operation, and the lock member 90 is separated from the cylindrical wall 49 while the brake gear 82 is separated from the engagement gear 54 (the meshing between the engagement gear 54 and the brake gear 82 is released), which results in the state in which the vertical movement and rotation of the reel 41 are permitted.

The leader tape 22 is drawn after the door 30 opening. The leader tape 22 of the reel 41 is housed and held in the slot portions 24 with the same arrangement angle as the reel 40, so that the drawing member of the drive apparatus can securely engage the aperture 22A of the leader tape 22.

Further, since the weight (winding amount) of the reel 41 is lighter (smaller) than the weight (winding amount) of reel 40, the torque drawing the leader tape 22 from the reel 41 is smaller than the drawing torque for the reel 40, and the tension adjustment is already finished on the drive apparatus side. Therefore, similarly to the recording tape cartridge 10, the drive apparatus can preferably draw the leader tape 22 from the inside of the case 12.

In this way, when the recording tape T drawn from the case 12 through the leader tape 22, similarly to the recording tape cartridge 10, is wound around the take-up reel (not shown) of the drive apparatus, and recording the information in the recording tape T or reproducing the information recorded in the recording tape T is performed by the recording and reproduction head (not shown). The recording tape cartridge 11 is changed from the state shown in FIG. 18 to the state shown in FIG. 17 after the information recording or reproduction is finished.

In other words, the meshing between the drive gear 102 and the reel gear 50 is released by drawing the rotary shaft 100 from the gear opening 18, the brake member 80 descends in association with the meshing release operation, and the lock member 90 engages the cylindrical wall 49 while the brake gear 82 meshes with the engagement gear 54. That is, the vertical movement and rotation of the reel 41 are blocked. Then, the recording tape cartridge 11 is discharged from the drive apparatus while the door 30 is being closed.

As described above, according to the present invention, the recording and the reproduction can be performed by the same drive apparatus irrespective of the capacity of the recording tape.

The recording tape is stably wound, and the vibration of the flange is decreased during the rotation of the reel.

Further, other parts except for the reels having the different diameters can be used for the tape cartridges with different tape amounts, so that the production cost is not increased.

In the embodiments, the coil spring 58 is adopted as the means for urging the lock member 90 radially outward from the center of the reel 40 (mounting portion 60) by way of example. However, the urging means is not limited to the coil spring 58, but may be formed by a plate spring, a torsion spring, or the like. When the urging means is configured to be arranged in the substantially center portion of the inside surface of the top plate 14A (center of the mounting portion 60), a dead space is effectively utilized in the case 12, and the compact urging means can preferably be configured.

In the embodiments, the lock member 90 is caused to slide in the radial direction by engaging the brake member 80, but the configuration in which the lock member 90 is caused to slide in the radial direction is not limited to the embodiments. For example, a switching member which switches the lock member 90 between a rise and descent locking position (position where the movement of the reel 40 is blocked in the shaft direction) and a rise and descent permitting position (position where the movement of the reel 40 is permitted in the shaft direction) may be provided separately from the brake member 80. However, in this case, it is preferable that the switching member is operated in conjunction with the brake member 80. The leader member is not limited to leader tape 22 shown in the drawings, but a leader pin or a leader block may be used as the leader member.

The invention is not limited to the above embodiments, but various modifications can be made. It is obvious that such modifications are also included in the scope of the invention.

What is claimed is:

1. A recording tape cartridge comprising:
   a reel having a low capacity reel hub and upper and lower flanges, wherein a recording tape is wound around the hub, the upper and lower flanges are provided at upper and lower end surfaces of the hub, and the upper and lower flanges regulate end portions in a width direction of the recording tape;
   a cylindrical wall positioned concentrically within the low capacity reel hub, the cylindrical wall configured to interact with a cartridge brake member and a cartridge lock member and the cylindrical wall has substantially same diameter as a high capacity reel hub;
   a case which rotatably accommodates the reel; and
   a leader member which is attached to an end portion of the recording tape,
   wherein the recording tape drawn from the reel is arranged substantially along a sidewall of the case during nonuse in which the leader member is held in the case; and
   wherein the low capacity reel hub and the cylindrical wall are joined to each other by an annular joint portion, and a region where the annular joint portion is joined to the low capacity reel hub is located half of the distance between the upper flange and the lower flange or toward the lower flange side at the outer peripheral surface of a drum of the low capacity reel hub.

2. A recording tape cartridge according to claim 1, wherein a thickness of the hub is equal to or larger than a thickness of the annular joint portion.

3. A recording tape cartridge according to claim 1, wherein the upper flange of the hub and the annular joint portion are integrally made of a resin material, and a lower end surface of the hub abuts on the lower flange while welding is performed between the lower flange and a convex portion provided at a lower surface of the annular joint portion.

4. A recording tape cartridge comprising:
a reel having a low capacity reel hub and upper and lower flanges, wherein a recording tape is wound around the hub, the upper and lower flanges are provided at upper and lower end surfaces of the hub, and the upper and lower flanges regulate end portions in a width direction of the recording tape;
a cylindrical wall positioned concentrically within the low capacity reel hub, the cylindrical wall configured to interact with a cartridge brake member and a cartridge lock member and the cylindrical wall has substantially same diameter as a high capacity reel hub;
a case which rotatably accommodates the reel; and
a leader member which is attached to an end portion of the recording tape,
wherein the recording tape drawn from the reel is arranged substantially along a sidewall of the case during nonuse in which the leader member is held in the case and wherein the leader member is formed in a film-tape shape, and the leader member is held by a slit-shaped housing portion formed along the sidewall of the case.

5. A recording tape cartridge according to claim 4, further comprising an RFID which identifies the size of the reel hub.

6. A recording tape cartridge comprising:
a reel having a hub and upper and lower flanges, wherein a recording tape is wound around the hub, the upper and lower flanges are provided at upper and lower end surfaces of the hub, and the upper and lower flanges regulate end portions in a width direction of the recording tape;
a cylindrical wall positioned concentrically within the hub, the cylindrical wall configured to interact with a cartridge brake member and a cartridge lock member and wherein the diameter of the cylindrical wall approximates the hub diameter of a smaller-diameter-hub recording tape cartridge reel;
a case which rotatably accommodates the reel; and
a leader member which is attached to an end portion of the recording tape,
wherein the recording tape drawn from the reel is arranged substantially along a sidewall of the case during nonuse in which the leader member is held in the case and wherein the leader member is formed in a film-tape shape, and the leader member is held by a slit-shaped housing portion formed along the sidewall of the case.

7. A recording tape cartridge according to claim 6, further comprising an RFID which identifies the size of the reel hub.

8. A recording tape cartridge comprising:
a reel having a hub and upper and lower flanges, wherein a recording tape is wound around the hub, the upper and lower flanges are provided at upper and lower end surfaces of the hub, and the upper and lower flanges regulate end portions in a width direction of the recording tape;
a cylindrical wall positioned concentrically within the hub, the cylindrical wall configured to interact with a cartridge brake member and a cartridge lock member and wherein the diameter of the cylindrical wall approximates the hub diameter of a smaller-diameter-hub recording tape cartridge reel;
a case which rotatably accommodates the reel; and
a leader member which is attached to an end portion of the recording tape,
wherein the recording tape drawn from the reel is arranged substantially along a sidewall of the case during nonuse in which the leader member is held in the case, and wherein the hub and the cylindrical wall are joined to each other by an annular joint portion, and a region where the annular joint portion is joined to the hub is located half of the distance between the upper flange and the lower flange or toward the lower flange side at the outer peripheral surface of a drum of the hub.

9. A recording tape cartridge according to claim 8, wherein a thickness of the hub is equal to or larger than a thickness of the annular joint portion.

10. A recording tape cartridge according to claim 8, wherein the upper flange of the hub and the annular joint portion are integrally made of a resin material, and a lower end surface of the hub abuts on the lower flange while welding is performed between the lower flange and a convex portion provided at a lower surface of the annular joint portion.

* * * * *